US008010337B2

(12) United States Patent  
Narayanan et al.

(10) Patent No.: US 8,010,337 B2  
(45) Date of Patent: Aug. 30, 2011

(54) PREDICTING DATABASE SYSTEM PERFORMANCE

(75) Inventors: Dushyanth Narayanan, Cambridge (GB); Eno Thereska, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 1513 days.

(21) Appl. No.: 11/116,690

(22) Filed: Apr. 27, 2005

(65) Prior Publication Data

US 2006/0074970 A1    Apr. 6, 2006

Related U.S. Application Data

(60) Provisional application No. 60/612,022, filed on Sep. 22, 2004.

(51) Int. Cl.  
*G06F 9/45* (2006.01)

(52) U.S. Cl. .......................................... 703/22; 707/705

(58) Field of Classification Search .................... 703/21, 703/22; 702/80; 707/607, 688  
See application file for complete search history.

(56) References Cited

U.S. PATENT DOCUMENTS

| | | | | |
|---|---|---|---|---|
| 6,035,306 | A * | 3/2000 | Lowenthal et al. | 707/200 |
| 6,038,391 | A * | 3/2000 | Kawaba | 703/21 |
| 6,145,121 | A * | 11/2000 | Levy et al. | 717/135 |
| 6,751,583 | B1 * | 6/2004 | Clarke et al. | 703/17 |
| 2003/0139918 | A1 * | 7/2003 | Hardwick et al. | 703/22 |
| 2004/0148152 | A1 * | 7/2004 | Horikawa | 703/22 |
| 2004/0172220 | A1 * | 9/2004 | Prekeges et al. | 702/186 |
| 2006/0025985 | A1 * | 2/2006 | Vinberg et al. | 703/22 |

OTHER PUBLICATIONS

Martin et al., Proceedings of the 30th Annual International Symposium on Computer Architecture (ISCA'03), pp. 1-12, 2003.*  
Ramirez et al., International Journal of Parallel Programming, vol. 30, No. 5, Oct. 2002 ( © 2002), pp. 373-395, 2002.*  
Skadron et al., IEEE Transactions on Computers, vol. 48, No. 11, Nov. 1999, pp. 1260-1281.*  
Uysal et al., D. O'Hallaron (Ed.): LCR'98, LNCS 1511, pp. 243-258, 1998.*  
Thomasian, A., G. Haring et al. (Eds.): Performance Evaluation, LNCS 1769, pp. 305-327, 2000.*  
Lo et al., Proceedings of the 25th Annual International Symposium on Computer Architecture, pp. 1-12, Jun. 1998.*  
Barham, et al.; "Using Magpie for request extraction and workload modeling"; Proc. 6th Symp. On Operating System Design and Implementation; San Francisco, CA; Dec. 2004.  
Mattson, et al.; "Evaluation techniques for storage hierarchies"; IBM Systems Journal; vol. 9, No. 2; 1970; pp. 78-117.

(Continued)

*Primary Examiner* — Cheyne D Ly

(57) ABSTRACT

A prediction system may perform capacity planning for one or more resources of a database systems, such as by understanding how different workloads are using the system resources and/or predicting how the performance of the workloads will change when the hardware configuration of the resource is changed and/or when the workload changes. The prediction system may use a detailed, low-level tracing of a live database system running an application workload to monitor the performance of the current database system. In this manner, the current monitoring traces and analysis may be combined with a simulation to predict the workload's performance on a different hardware configuration. More specifically, performance may be indicated as throughput and/or latency, which may be for all transactions, for a particular transaction type, and/or for an individual transaction. Database system performance prediction may include instrumentation and tracing, demand trace extraction, cache simulation, disk scaling, CPU scaling, background activity prediction, throughput analysis, latency analysis, visualization, optimization, and the like.

17 Claims, 14 Drawing Sheets

OTHER PUBLICATIONS

Denehy, et al.; "Deconstructing storage arrays"; Proc. Of the Architectural Support for Programming Languages and Operating Systems Conference; Cot. 2004.

Schindler, et al.; "Lachesis: Robust Database Storage Management Based on Device-Specific Performance Characteristics"; Proc. $29^{th}$ VLDB Conference; Sep. 2003.

Seltzer, et al.; "Disk Scheduling Revisited"; Proc. 1990 USENIX Winter Conference; Sep. 2003.

Anderson, et al.; "Simple Table-Based Modeling of Storage Devices"; Hewlett-Packard Laboratories; 2001; SSP Technical Report HPL-SSP-2001-4.

Wang, et al.; "Storage Device Performance Prediction with Cart Models"; Proc. $12^{th}$ Meeting of the IEEE/ACM International Symposium on Modeling, Analysis and Simulation of Computer and Telecommunications Systems; Oct. 2004.

Ailamaki et al.; "DBMSs on a modern processor: where does time go?"; Proc. $25^{th}$ VLDB Conference; Sep. 1999.

Barroso, et al.; "Memory system characterization of commercial workloads"; Proc. $25^{th}$ International Symposium on Computer Architecture; Jun. 1998.

Marin, et al.; "Cross-architecture performance predictions for scientific applications using parameterized models"; Proc. International Conference on Measurements and Modeling of Computer Systems 2004; Jun. 2004.

Rosenblum, et al.; "The impact of architectural trends on operating system performance"; Proc. $15^{th}$ ACM Symposium on Operating Systems Principles; Dec. 1995.

* cited by examiner

PREDICTING DATABASE SYSTEM PERFORMANCE

CROSS-REFERENCE TO RELATED APPLICATION

This application claims the benefit of U.S. Provisional Patent Application Ser. No. 60/612,022, filed Sep. 22, 2004, which is incorporated herein by reference.

TECHNICAL FIELD

This description relates generally to database systems, and more specifically to predicting performance of a database system.

BACKGROUND

Database systems may run transactional workloads such as back-ends to e-commerce, banking, travel reservation systems, and the like. Database systems are very complex to manage and database management and administration is an extremely important yet difficult task. Database and storage systems are growing increasingly complex to manage. It requires a skilled administrator—representing a large investment of time and money—to monitor the behavior of a database installation, and to adjust the hardware and software configuration in order to keep pace with changing workloads, user requirements, and hardware device failures. The administrator's job includes initial database configuration, continuous monitoring of the database's performance and knob tuning, as well as continuous reconfiguration, either to update the database resources or re-organize them in a different way.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A prediction system may work with and/or be a part of a database system to automatically monitor the performance of the server to aggregate statistics such as I/O queue lengths as well as the latency and critical path of individual transactions. Using this traced information, the prediction system may answer 'what if' questions such as 'what if the amount of memory available to the server were doubled' or 'what will be the difference in latency and/or throughput of the system if the transaction rate changes.' The prediction tool may provide an answer such as 'throughput will increase by 40%, the latency of new order transactions will go down by 20%, and that of order status transactions will remain unchanged.' Accurate answers to such questions may be of value in provisioning the database system so that it continues to meet the customer's throughput and/or latency requirements.

To reduce the administrative burden on the database administrator, the monitoring of and/or determining updates to the database system may be partially or completely automated, such as with a prediction system which may monitor and analyze a running system, and may analyze and/or recommend configuration changes as required.

Since system resources such as the main system memory, the disk, and/or CPU may be a bottleneck of database systems, the prediction system may perform the capacity planning for one or more of these systems, such as by understanding how different workloads are using the system resources and/or predicting how the performance of the workloads will change when the hardware configuration of the resource is changed and/or when the workload changes.

To perform capacity planning for a system resource (e.g., memory, disk, CPU, and the like), the prediction system may predict database system performance when resources are added and/or removed to form a different hardware configuration. More particularly, the prediction system may use a detailed, low-level tracing of a live database system running an application workload to monitor the performance of the current database system. In this manner, the current monitoring traces and analysis may be combined with a simulation to predict the workload's performance on a different hardware configuration. More specifically, performance may be indicated as throughput and/or latency, which may be for all transactions, for a particular transaction type, and/or for an individual transaction.

The performance indicators may be provided for the hardware configuration of the live (current) hardware configuration and/or for the virtual hardware configuration of a hypothetical database system. In this manner, the performance may be compared and/or evaluated to determine if the new hardware configuration should be implemented, if the current hardware configuration is sufficient, and the like. The virtual hardware configuration may indicate a different amount of buffer cache memory (greater or smaller than the live system), a different CPU clock speed (higher or lower than the live system), different I/O bandwidth (higher or lower than the live system), and the like.

Database system performance prediction may include instrumentation and tracing, demand trace extraction, cache simulation, disk scaling, CPU scaling, background activity prediction, throughput analysis, latency analysis, visualization, optimization, and the like. Instrumentation and tracing may include instrumenting the database (DB) system code at appropriate places to derive detailed, low-level traces of server and system activity in a live database system. Demand trace extraction may include processing the derived traces to separate workload-specific aspects (demand) from hardware-specific aspects (service). The CPU, buffer cache, and/or I/O demands of individual transactions and/or background tasks may be extracted as a portion of the demand trace.

The demand trace may be forwarded to a cache simulator, storage model component, and/or CPU model component to predict the behaviors of those resources using the current and/or virtual hardware configurations. Cache simulation may include computing the cache behavior (e.g., hits and misses) of the database system for any virtual buffer cache size. From the computed cache behavior, the I/O requests that would be issued under the new regime may be computed. CPU and/or disk scaling may be provided by the storage model and CPU model components. CPU scaling may include computing the time taken to satisfy each computation in the demand trace given some virtual CPU speed, and may also compute the overhead of locking and cache contention given the number of CPUs in the virtual configuration. Disk scaling may include computing the time taken to satisfy an I/O request in the demand trace given some virtual disk bandwidth. Background activity prediction may include determining the computation and/or I/O cost of background activity, such as cache block eviction and/or lazy disk writes, for the new hardware configuration.

Throughput analysis may include predicting the average load per transaction on the CPU and/or the I/O subsystem on the new hardware, which may be used in a bottleneck analysis to derive the number of transactions per second that the database system can support for the live workload represented by the demand trace. Latency analysis may include predicting the latency of each transaction and/or the average latency by transaction type or all transactions such as by using a combination of simulation and analysis on the per-transaction traces. In this manner, given the trace of a live database system having a current hardware configuration, the throughput and/or latency of the same workload may be determined for the current hardware configuration and may be predicted for a virtual hardware configuration.

In some cases, an artificial intelligence component and/or optimizer may be provided that employs a probabilistic and/or statistical-based analysis to suggest or infer an action that a user desires to be automatically performed.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
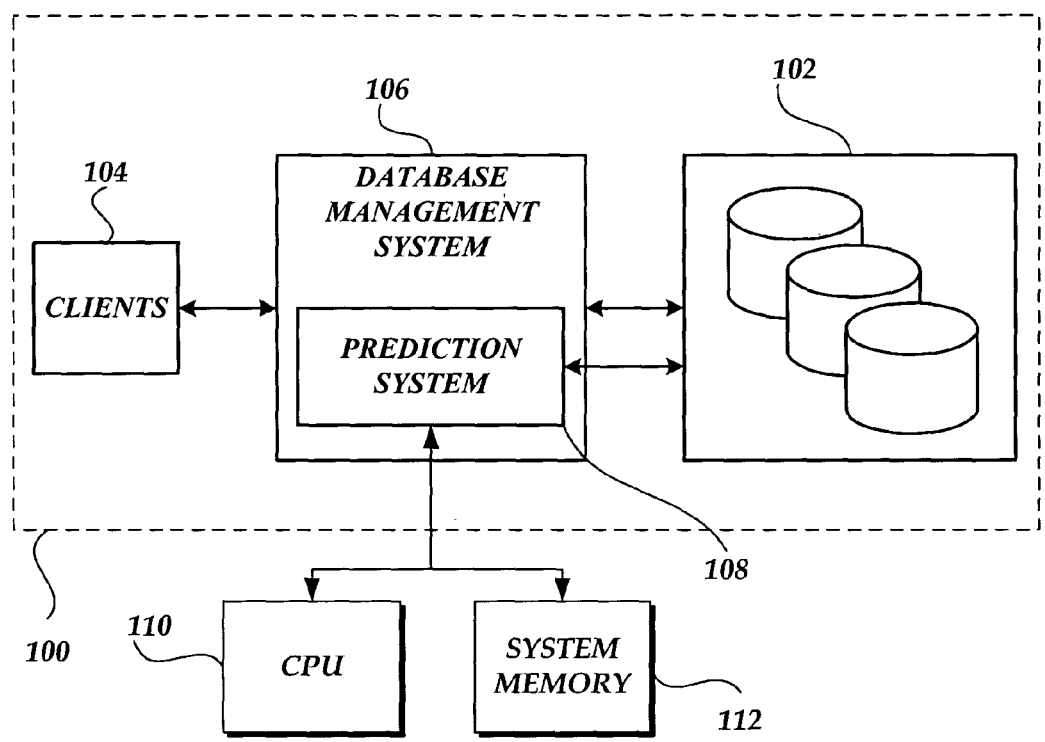
FIG. 1 illustrates a schematic block diagram of an example database system.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a prediction system of a database system, the prediction system described is provided as an example and not a limitation. As those skilled in the art will appreciate, the implementation of the prediction system and/or combination of the prediction system in a database system may be applied to any computing device with a hardware configuration including a disk, CPU, and/or buffer cache.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computing device. By way of illustration, both an application running on a server and the server can be a component. One or more components can reside within a process and/or thread of execution, and a component can be localized on one computing device and/or distributed between two or more computing devices.

As used herein, the terms "infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Prediction System

A prediction system may help a database administrator by reducing the burden of continuously monitoring the database system and predicting how adding or changing resources or workload would affect the database system. Example resources which may affect database system performance include main system memory, the CPU (central processing unit), disk I/O, and the like.

The CPU (Central Processing Unit) may be a bottleneck in a database system, and thus, CPU monitoring may detail where the CPU time is spent. From this monitoring, predictions on how different database transactions may behave under different CPU designs (for example, with more L1/L2 cache, larger pipelines, a larger number of CPUs, etc.) may be possible. A prediction system may be combined with, include, and/or extend the CPU monitoring infrastructure, such as to encompass the activity of the main memory buffer cache.

Since the main system memory may be a bottleneck of a database system, the prediction system may perform capacity planning for system memory, such as by understanding how different workloads are using the memory, and may predict how the performance of the workloads may change when more memory is available and/or when the workload changes.

A prediction system may perform capacity planning for a storage system in combination with or as a part of capacity planning for a database system. Capacity planning for a storage system typically requires careful understanding from a system administrator on whether a storage device can satisfy the performance requirements of a client's workload and replacing the storage device when that is no longer the case.

Any suitable component may be used to perform capacity planning for a storage system. For example, a conventional tool called Minerva, available from Hewlett-Packard Laboratories of Palo Alto, Calif., is designed to continuously monitor disk I/Os, capture properties of those I/Os, and also characterize storage devices. By having a model of both the workload and the storage device, the Minerva tool then assigns the data of a workload to those devices it deems to be the most appropriate and issues a performance prediction on how well it thinks the workload will perform on the device.

In another example, a tool called Magpie, available from Microsoft Corp. of Redmond, Wash., provides an infrastructure which allows an understanding of system behavior through detailed monitoring. Hence, the results may be more accurate than in the approach where the system is replaced with a simpler model of its behavior. Magpie is discussed further in Barham, et al., "Using Magpie for request extraction and workload modeling," Proc. 6th Symp. On Operating Sys. Design and Implementation, San Francisco, Calif., December, 2004, which is incorporated herein by reference.

Conventional monitoring systems may monitor disk I/O and capture crucial disk properties, but treat the storage device as a black box. Typically, samples are run from the workload on the storage device offline. The observed performance of the offline storage device may be used to generalize future unknown workloads. However, the observed performance depends on the quality of the training samples. Hence, the prediction accuracies are often low when the training samples are not representative of the real workload the device will see in the future. A prediction system may limit the number of detected extractions like conventional monitoring systems, however, in some cases, a future workload may have a different transaction mix. In contrast to conventional monitoring systems, the database system being monitored may be online, and thus, many more training samples may be available for processing and analysis as compared to samples of workload run on a storage device offline.

Another way to make performance predictions is by using detailed simulations of the system. Conventional systems evaluations, due to the impact of changing various memory configurations, can be evaluated using a full system simulator. Whereas having such a simulator is certainly desirable, it is often very difficult if not impossible to construct a complete simulator of the database server.

Conventional monitoring tools include performance counters (displayed through the performance monitor) and also other detailed statistics maintained in virtual tables. However, what is missing is a general framework for allowing the customer to better understand the performance of the server and ask "what-if" questions about the memory subsystem.

Referring now to FIG. 1, there is illustrated a schematic block diagram 100 of a database system in accordance with the subject invention. The database system 100 includes a data storage system 102 which may be accessed by one or more clients 104. In support thereof, the database system 100 may include a database management system (DBMS) 106 that facilitates interfacing to the storage system 102 by the clients 104. The database system 100 may include a prediction system 108 that provides performance prediction capabilities. As shown in FIG. 1, the prediction system may be a part of the database management system 106, or alternatively, by be a separate, standalone component. The prediction system 108 may interface with a CPU 110, the data storage system 102, and/or and the system memory 112, such as to monitor performance of the database management system 106.

For example, the prediction system 108 may perform detailed, low-level tracing of the CPU 110, the system memory 112, and/or the live database system 100 running an application workload. The prediction system may simulate and/or analyze these traces to analyze the workload's performance on the current hardware configuration and/or predict the workload's performance on a different hardware configuration of the database system 100. Specifically, maximum server throughput and latency per transaction type may be predicted for virtual hardware configurations with a different amount (greater or smaller) of buffer cache memory, a different (higher or lower) CPU clock speed, different (higher or lower) I/O bandwidth, and the like.

Figure 2:
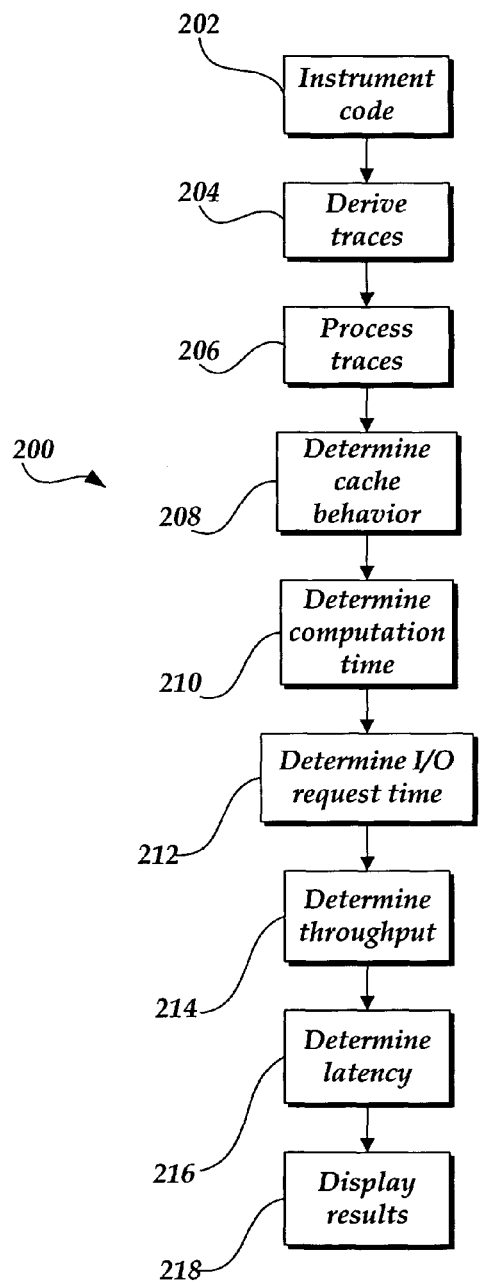
FIG. 2 illustrates a flow chart of an example methodology of performance prediction in accordance with the prediction system of FIG. 1.

FIG. 2 illustrates an example method 200 of performance prediction which may be implemented by the prediction system 108 of FIG. 1. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology of a prediction system.

Referring to FIG. 2, the prediction performance of a database system may include instrumenting 202 code, such as the database (DB) server, operating system kernel, and the like at appropriate places. The results of the instrumentation in a live database system may be analyzed to derive 204 detailed, low-level traces of server and/or system activity in a live database system. The traces may be processed 206 to separate the workload specific aspects (demand traces) from the hardware specific aspects (service traces). For example, the CPU, buffer, cache, and/or I/O demands of individual transactions and/or background tasks may be extracted during the trace processing 206.

The behavior of the cache (e.g., hits and misses) in response to the demand trace may be determined 208. The behavior of the cache of the current, live hardware configuration and/or a virtual hardware configuration of the database system may be computed given the respective current or virtual buffer cache size. The virtual cache size may be the same as, larger, or smaller than the current hardware configuration of the database system. The behavior of the new cache may be determined in any suitable manner, such as through a cache simulation. A cache simulation may receive the extracted demand traces and determine the behavior of a new cache system. The determined behavior of the new cache system may provide the I/O request stream that would be issued under the respective hardware configuration of the cache system.

The time taken to satisfy each computation in the demand trace may be determined 210. For example, given a new (virtual) CPU speed of a new hardware configuration of the database system and the extracted demand traces, the time to satisfy the demand trace computations may be extracted, for example, through CPU scaling. The CPU time determination 210 may include determining the computation cost of background activity based on the virtual hardware configuration of the CPU. Any background tasks may be determined such as cache block eviction, and the like.

In a similar manner, the service time taken to satisfy each I/O request in the demand trace may be determined 212. For example, given a new (virtual) disk bandwidth of a new hardware configuration of the database system and the I/O request stream (from the demand trace and/or the predicted I/O request stream), the time to satisfy the I/O requests may be extracted, for example, through disk scaling. The I/O time determination 212 may include determining the I/O cost of background activity based on the new hardware configuration of the disk. Any background tasks may be determined such as lazy disk writes, and the like.

The throughput of the database system may be determined 214, which may be determined for the current and/or virtual hardware configurations. For example, the average load per transaction on the CPU and/or I/O subsystem on the new hardware may be predicted. From the determined average load and the workload rate, the throughput, such as the maximum throughput, of the new hardware, may be derived such as by using bottleneck analysis.

The latency of one or more transactions may be determined 216. For example, a combination of simulation and analysis on the per-transaction traces may be used to predict the latency of one or more transactions. In this manner, an average latency of a transaction, transaction type, and/or all transaction on the new hardware may be determined for a particular transaction type. In a similar manner, the latency of the current hardware configuration may be determined.

The results of the latency and/or throughput analysis, the event tracing, the cache simulation, the storage model, and/or CPU model may be displayed to help the systems administrator visualize and/or analyze the performance of the database system.

Figure 3:
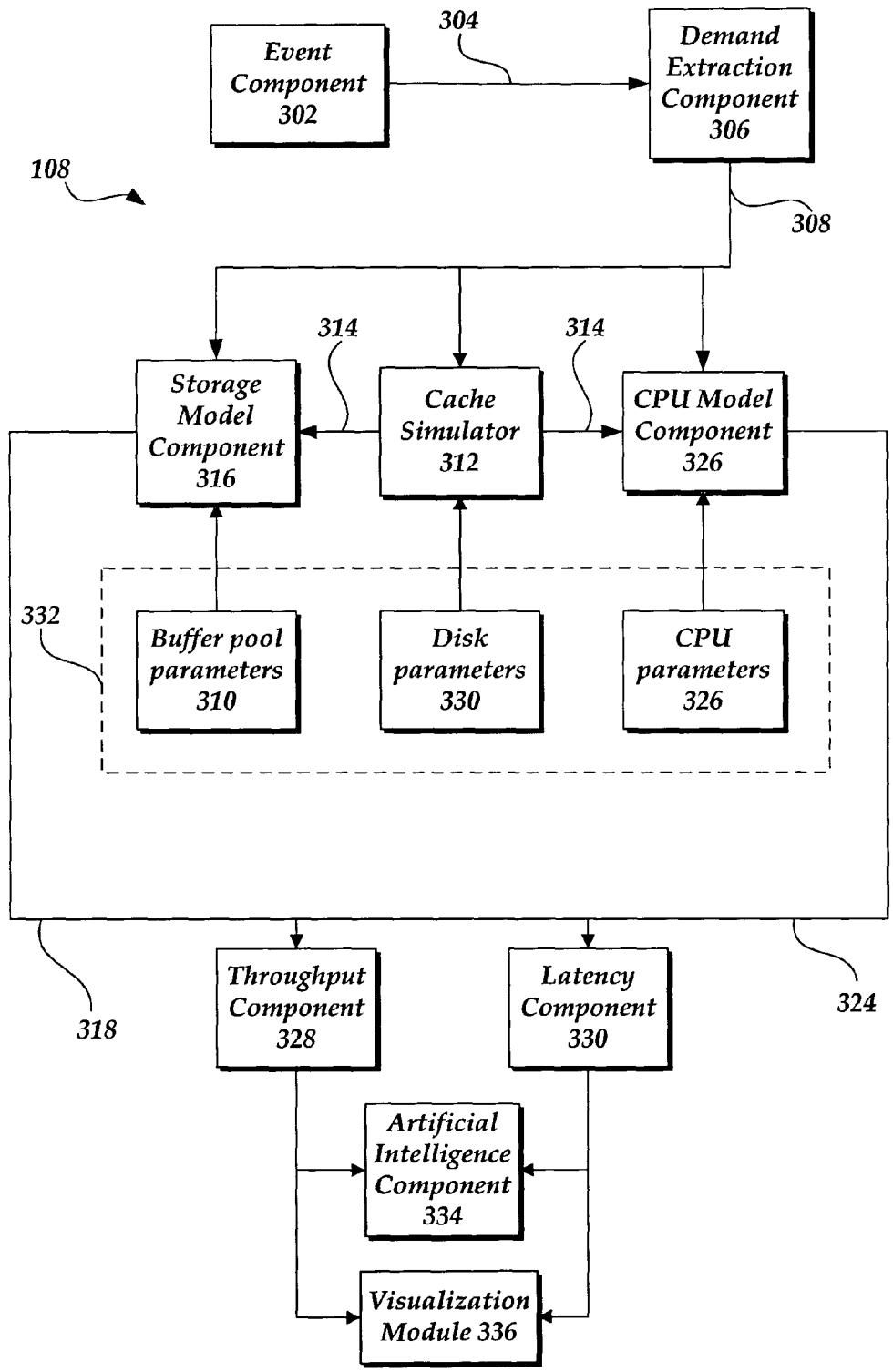
FIG. 3 illustrates a schematic block diagram of an example prediction system of FIG. 1.

FIG. 3 illustrates a schematic diagram of an example prediction system 108 of FIG. 1 which may implement the method 200 of FIG. 2. The event component may post and/or correlate the instrumented events from the live database system, CPU, and/or system memory. The event component 302 may provide the event traces 304 to a demand extraction component 306. With reference to the method of FIG. 2, the live database system may be instrumented 202 and operated to derive 204 live traces of server and/or database system activity.

With reference to FIG. 3, the demand extraction component 306 may process the live traces to separate the demand traces 308 which are workload specific from the service traces 310 which are hardware specific. The demand traces 308 may be provided to a cache simulator 312, a storage model component 318, and/or a CPU model component 322. In this manner, the response of the different hardware configurations, e.g. current and/or virtual, may be determined. The storage model component 316 may provide an output 318 such as a time to process a transaction in the I/O. The CPU model component may provide an output 324 such as the computation time to process a transaction. The hardware configuration 332 of the database system may be defined by buffer pool size 310, disk bandwidth 320, and/or processor speed 326, any of which may be the same as or different from the hardware configuration of the existing database system.

Figure 6:
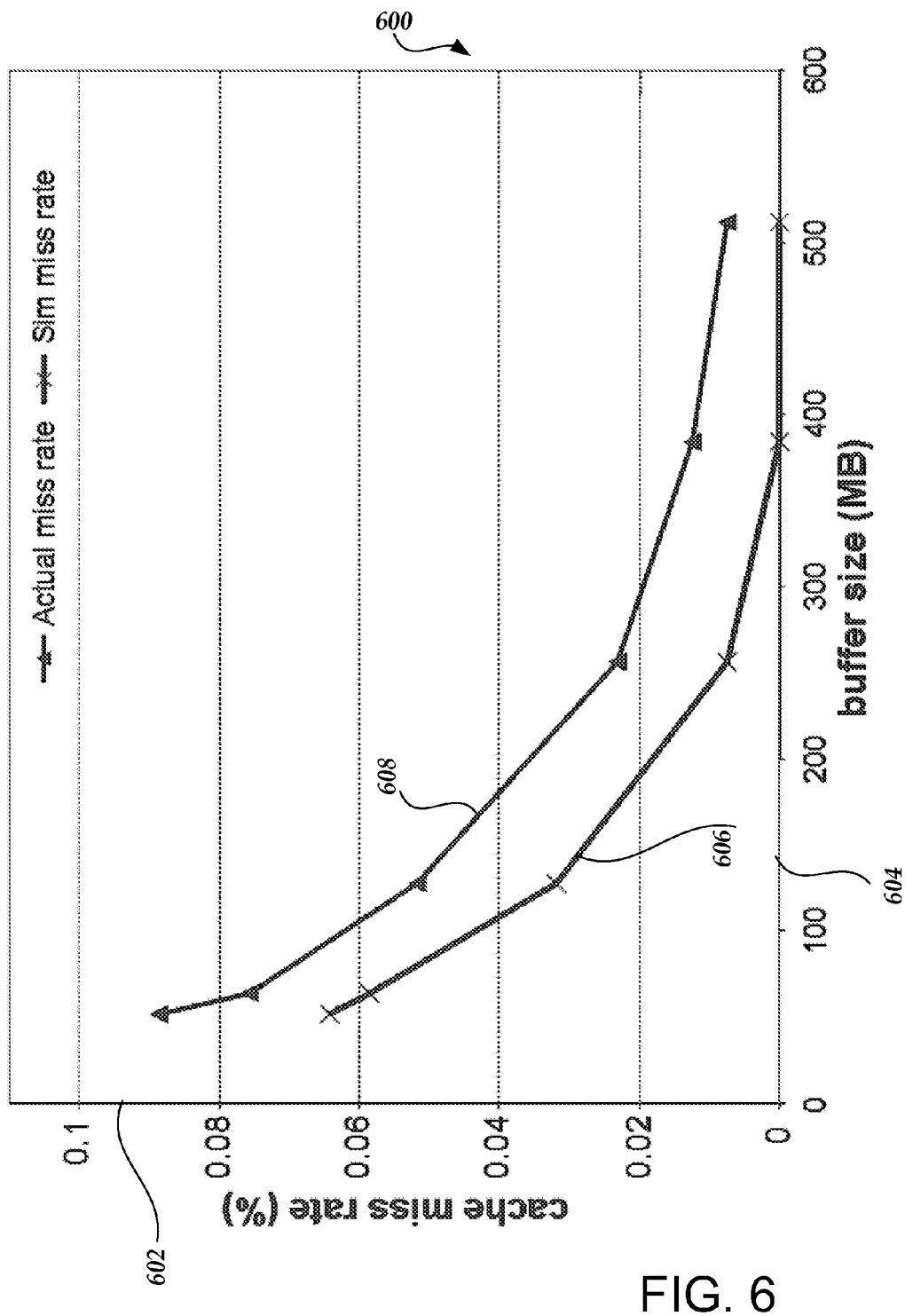
FIG. 6 illustrates a graph that represents example actual and simulated miss rates for a cache simulator in accordance with FIG. 3.
Figure 7:
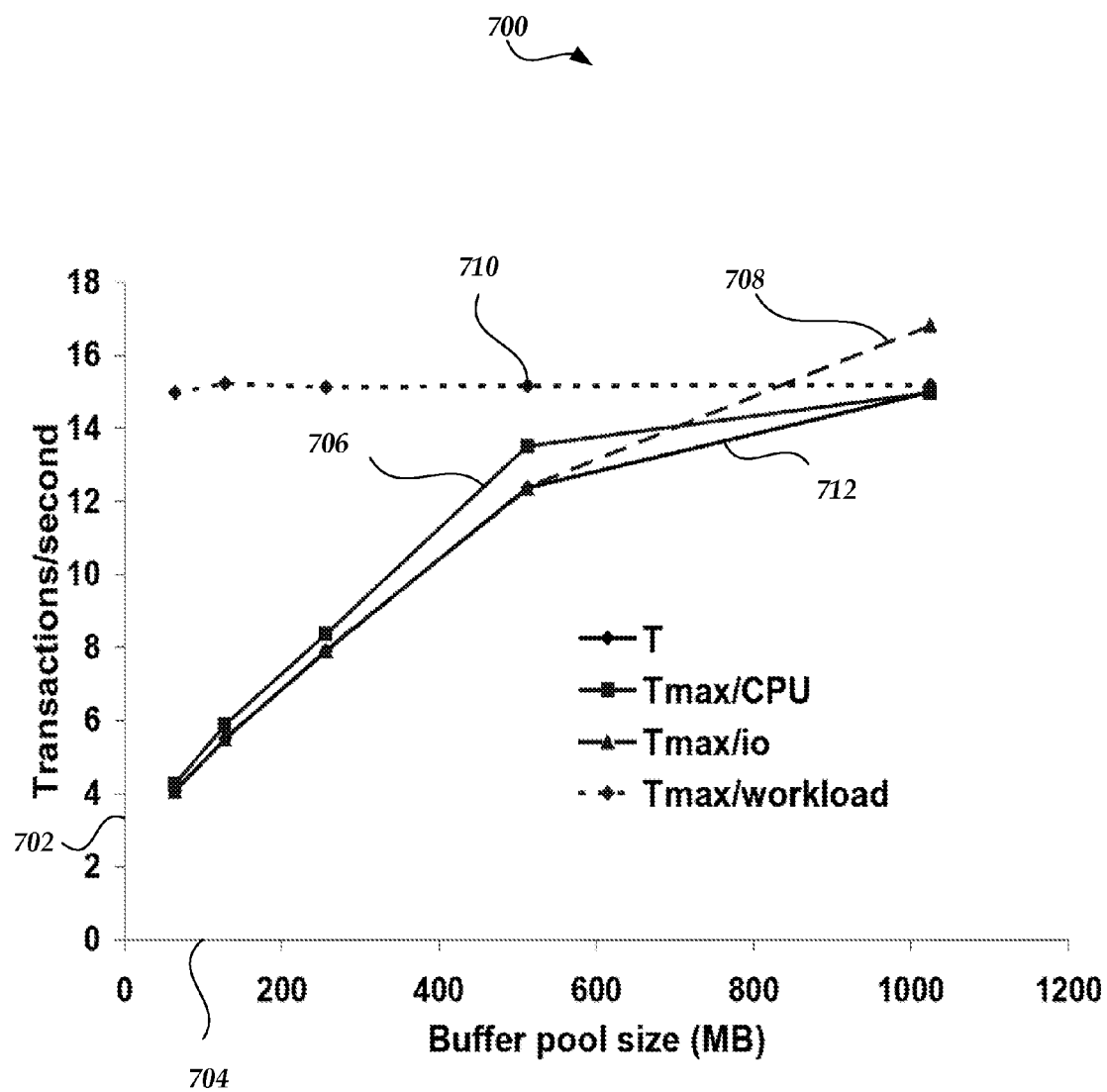
FIG. 7 illustrates a graph of an example bottleneck analysis for an example OLTP workload for various hardware configurations.
Figure 8:
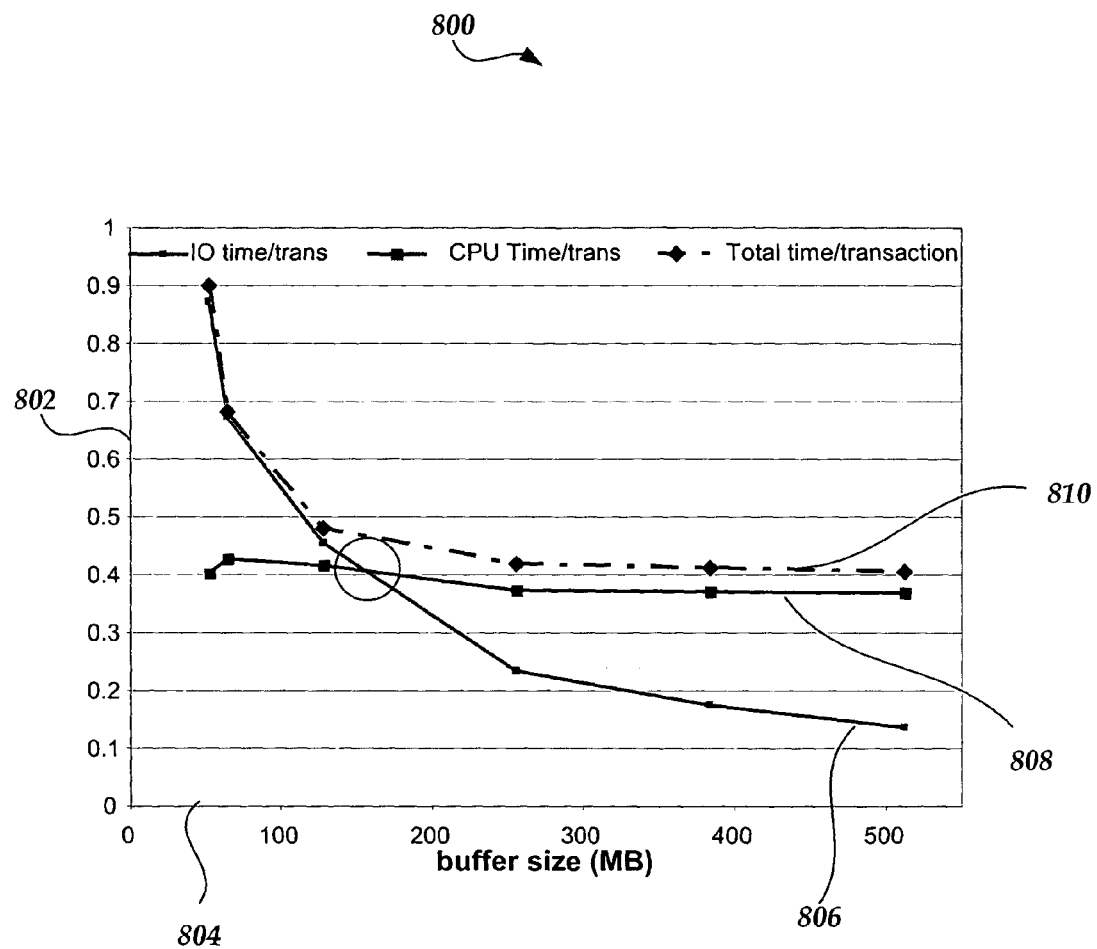
FIG. 8 illustrates a graph that represents example CPU time per transaction, example I/O time per transaction, and total time per transaction in accordance with the prediction system of FIG. 3.
Figure 9:
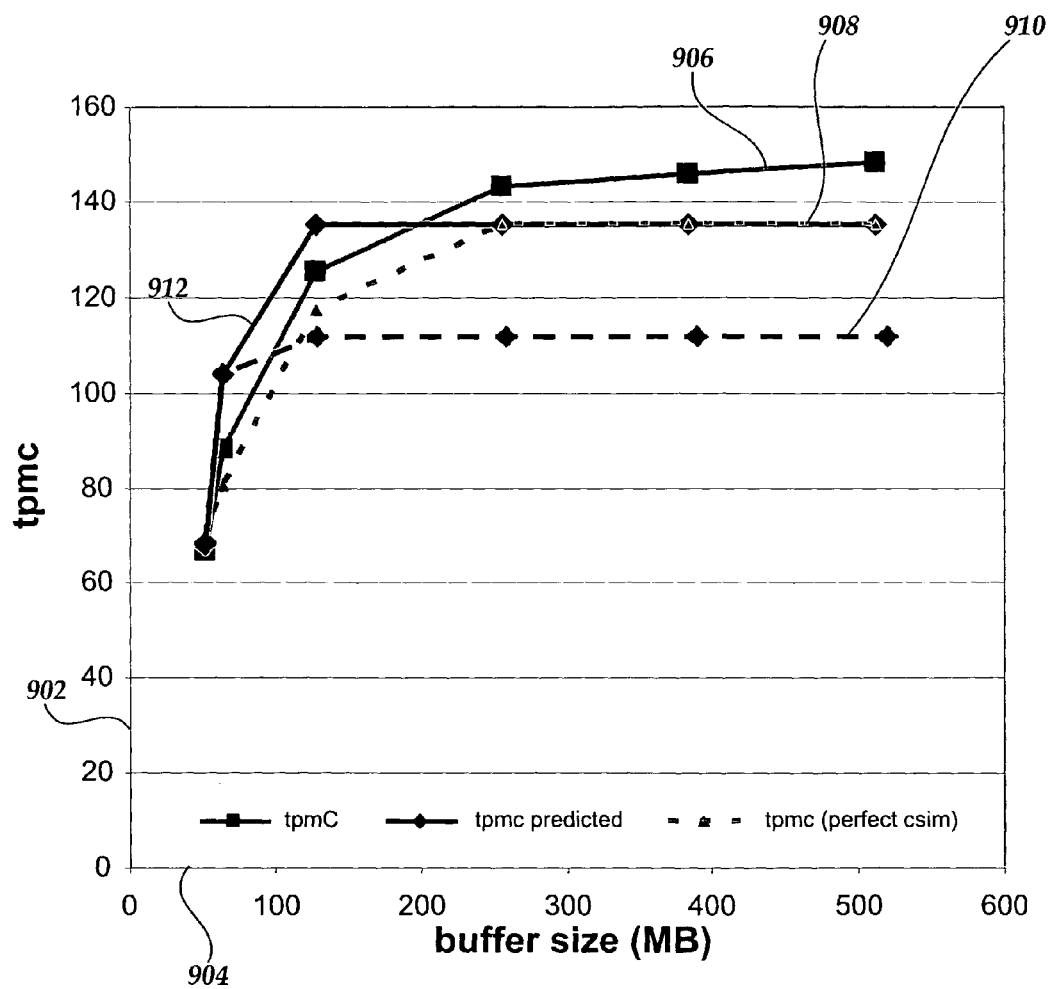
FIG. 9 illustrates a graph that represents example actual and predicted throughput in accordance with the prediction component of FIG. 3.

Performance of the database system may be evaluated, such as by determining the throughput of the database system with a throughput component 310 and/or determining the latency of a transaction with a latency component 330. Any input and/or output of the prediction system may be displayed by a visualization component 334. The visualization component may generate graphs, charts, alpha-numeric tables, and the like. Example visualizations which may be provided by the visualization component are illustrated in FIGS. 6-11 and 14. FIG. 6 illustrates a graph that represents example actual and simulated miss rates for a cache simulator. FIG. 7 illustrates an example graph illustrating bottleneck analysis for an example OLTP workload for various hardware configurations. FIG. 8 illustrates a graph that represents example CPU time per transaction, example I/O time per transaction, and total time per transaction as output of the storage model component and the CPU model component. FIG. 9 illustrates a graph 900 which represents example actual throughput 906 and predicted throughput 912 from the throughput component based on tracing the live system with 64 MB. The axis 902 represents the throughput and the axis 904 represents different buffer sizes. The output curve 908 represents the predicted throughput if the cache simulator were perfect and the output curve 910 represents the predicted throughput if there was no cache simulator.

Figure 10:
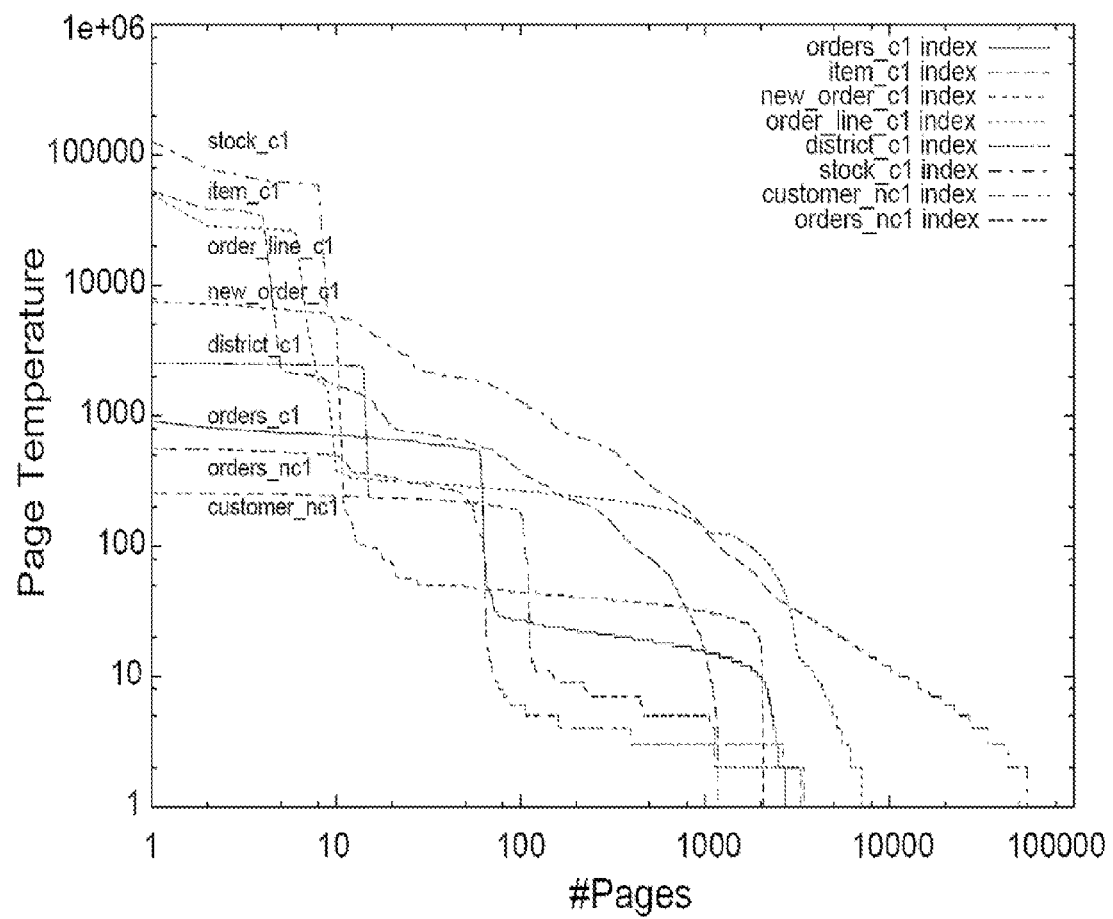
FIG. 10 illustrates a graphic representation of buffer page locality in a database system of FIG. 1.
Figure 11:
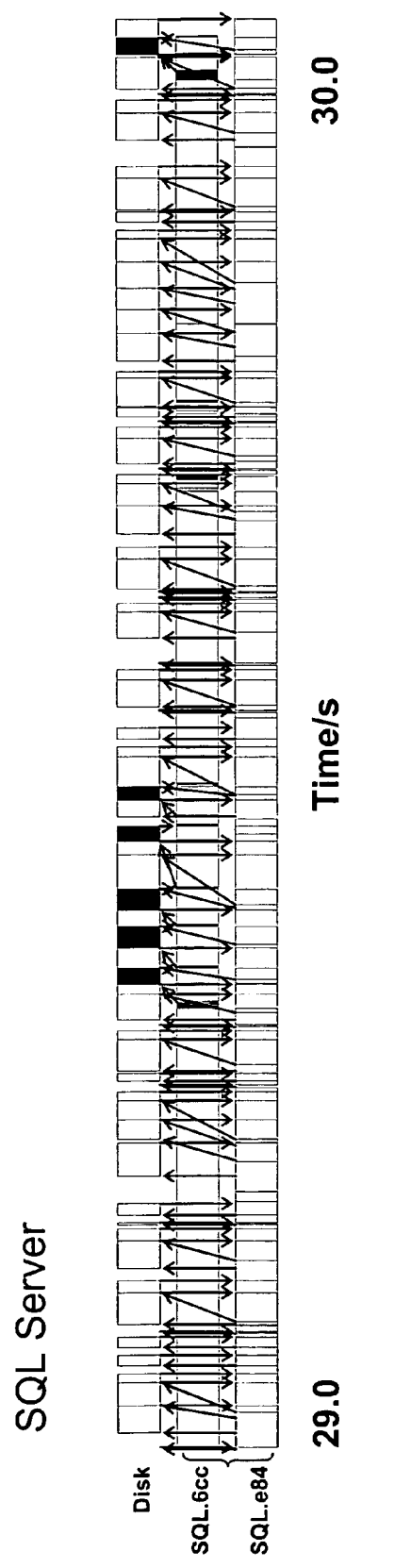
FIG. 11 illustrates a graphic of an example end-to-end tracing of events in a database system of FIG. 1.
Figure 14:
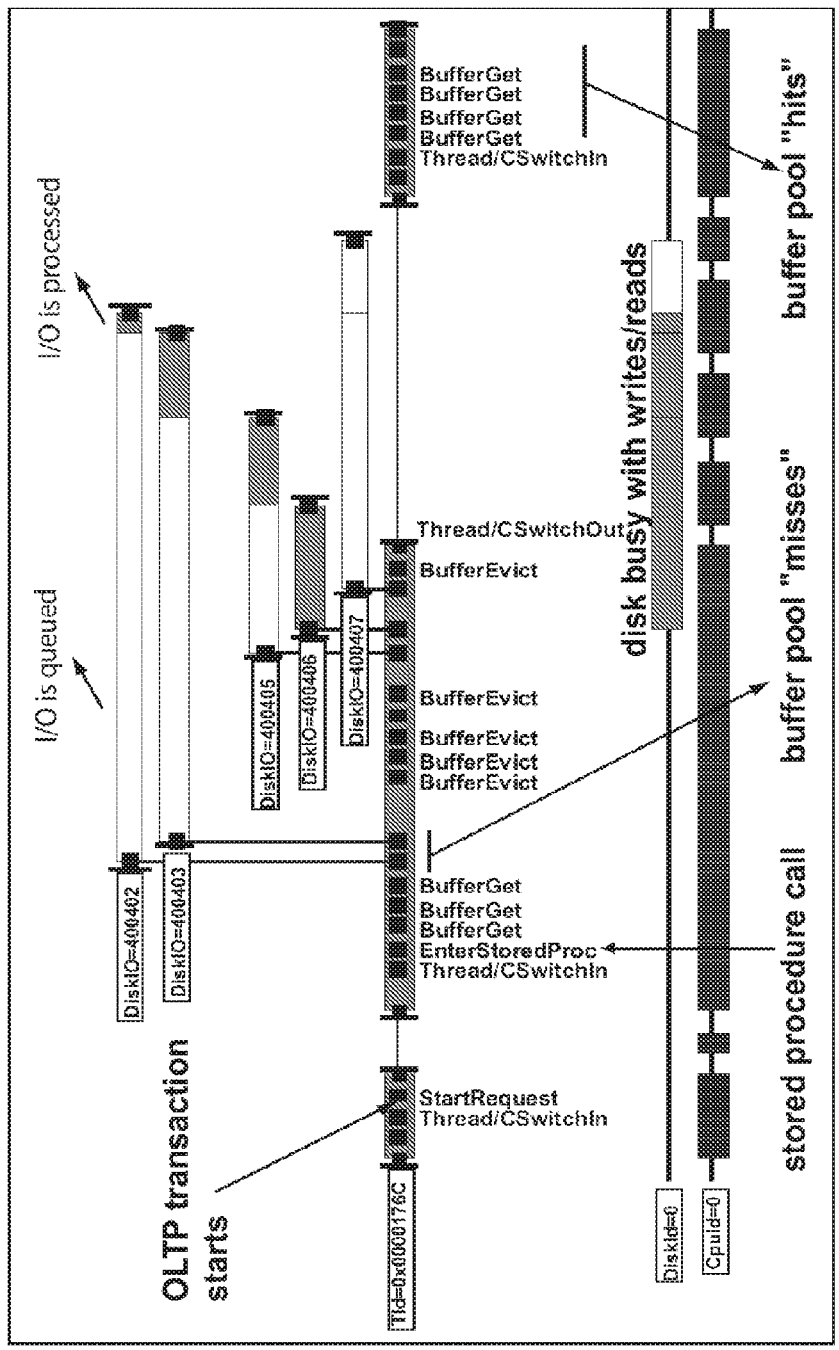
FIG. 14 illustrates a graphic of an example end-to-end trace of resource usage of a transaction in a database system of FIG. 1.

FIG. 10 illustrates an example page temperature table. FIGS. 11 and 14 illustrate graphic representations of example end-to-end tracing of events in a prediction system.

The database system may be monitored automatically, such as by an artificial intelligence component 334. The artificial intelligence component may include an optimizer that may analyze the current performance of the database system hardware configuration and suggest an improved hardware configuration to the system administrator. The optimization may use any suitable optimization technique and may be bounded in any suitable manner, such as by timing of hardware updates, monetary budgets, and the like.

Instrumentation and Tracing

To predict the performance of a workload on the current and/or different hardware configuration, sufficient information may be obtained about the workload's behavior by monitoring resource consumption in the database system. Since database performance depends on the interaction between multiple components as well as multiple types of transaction executing concurrently, it may be insufficient to trace aggregate per-resource utilization statistics. Accordingly, resources may be monitored such as by instrumenting the database system software (e.g., application, kernel code, and the like) to provide a detailed, low-level trace indicating the live system behavior. The traced live system behavior may in turn indicate or signal the use of resources such as CPU, memory, I/O, background, and the like.

A trace is a time-ordered sequence of events. The events may provide information about resource consumption (e.g., disk I/Os) and/or control transfer (e.g., a packet sent as part of a remote procedure call) within a request. The events may be stored in any suitable manner, and/or form. For example, the events may be logged by a tracing infrastructure such as Event Tracking for Windows available from Microsoft Corp., of Redmond, Wash.

Each tracked event may be associated with event parameters, such as a cycle-accurate timestamp, the user and/or kernel thread identification, and the like. The timestamp may be generated using the processor cycle counter. For example, Event Tracking for Windows logs events with a time stamp from the processor cycle counter, orders the events based on the time stamp. The tracing infrastructure may store the events and parameters in a data store and/or may produce a live event stream.

The events may be generated by instrumentation inserted into appropriate places in the database server code. The instrumentation may be newly inserted code (such as calls to C functions and/or binary modification techniques) or may be provided by one or more various application and/or kernel event providing tools. Classes of events which may be included in a trace may include buffer cache accesses, I/O requests and/or notifications, database scheduling events, transaction traces, operating system scheduler events, stored procedure invocations, and the like.

Buffer cache accesses (hits and misses) may include prefetch requests, demand (blocking) accesses, write latches (indicating the buffer must now be regarded as dirty), commits, synchronous (blocking) write requests, cache evictions, lazy (asynchronous) writebacks, and the like. For blocking operations, both entry and exit events may be recorded. Read requests may indicate whether the request was a hit or miss in the buffer cache. The buffer cache accesses may be used by the cache simulator as part of the input demand trace.

I/O requests, completions, and/or notifications may include disk I/O requests (read and/or write) such as those issued by the server I/O completion notifications received from the I/O subsystem, and the like. The I/O events may be used by the disk model component, such as to provide an average time for disk to service an I/O request.

Database scheduler events may include tasks (threads of control) created by the DB scheduler, context switches between the threads of control, control transfer and synchronization within the server (i.e., points here a thread starts or stops working on a specific request), and the like. Other events, such as the buffer cache events, the I/O events, and the like, may be annotated with an identifier of the currently running task, e.g., the current thread of control within which an event was generated. The database scheduler events may be used by the CPU model component to compute the amount of time used to execute the workload as well as that used by background activities. Background activities may include buffer cache maintenance, and the like. The kernel thread context-switch may be traced for example, by enabling that option in Windows Server 2003® software, available from Microsoft Corp. of Redmond, Wash.

Operating system scheduler events may include context switches of the operating system underlying the database server. The context switches may allow recordation of which thread belonging the database server was running on which processor at any given time.

Stored procedure invocations may include entry and/or exit into each or at least a portion of the stored procedures of the database management system, which may distinguish between different types of transaction.

Transaction traces may include client requests as they enter the database system and responses from the server.

In one example, the traced events may be sorted into control flow events, CPU scheduling events, buffer pool activity events, and disk I/O events. Example traced events for a database system using Windows Server 2003 software are shown below. Control flow events may indicate outside communications coming in and when those communications are picked up. Control flow events may include StartRequest, EndRequest, EnterStoredProc, and ExitStoredProc. A StartRequest event may indicate when a SQL transaction begins and have no event parameters. An EndRequest event may indicate when the SQL transaction ends and may have no event parameters. An EnterStoredProc event may indicate stored procedure invocation and may have a procedure name event parameter. An ExitStoredProc event may indicate stored procedure completion and may have the procedure name as an event parameter. CPU scheduling events may include SuspendTask, ResumeTask, Thread/CSwitchIn, and Thread/CSwitchOut. The CPU scheduling may indicate which thread is running at which time, and what that thread is doing. In this manner, where a thread picks up a new transaction may be identifier since each thread may run multiple transaction sequentially. A SuspendTask event may indicate the suspend user-level thread and may have a task identifier event parameter. A ResumeTask event may indicate when the user-level thread resumes and may have the task identifier as an event parameter. A Thread/CSwitchIn event may indicate when the kernel thread is scheduled and may have a CPU identifier and a system identifier as event parameters. A Thread/CSwitchOut event may indicate then the kernel thread is de-scheduled and may have a CPU identifier and a system identifier as event parameters. Buffer pool activity events may include BufferGet, BufferAge, BufferTouch, BufferDirty, BufferReadAhead, BufferEvict, and BufferNew. A BufferGet event may indicate a get reference to a buffer page (blocking) and may have a page identifier as an event parameter. A BufferAge event may indicate a reduction in the 'heat' of a page and may have a page identifier as an event parameter. A BufferTouch event may indicate an increase in the 'heat' of a page and may have a page identifier as an event parameter. A BufferDirty event may indicate marking of a page as dirty and may have a page identifier as an event parameter. A BufferReadAhead event may indicate prefetch pages (non-blocking) and may have a start page and number of pages as event parameters. A BufferEvict event may indicate eviction of a page to the fee pool and may have a page identifier as an event parameter. A BufferNew event may indicate allocation of a new page from the fee pool and may have a page identifier as an event parameter. Other buffer pool activity may be tracked as appropriate. For example, procedure cache, memory objects, query plans, sort/create index memory, and the like. Disk I/O events may include DiskIO and DiskIOComplete. A Disk I/O event may indicate an asynchronous read or write of pages and may have start page indicator and number of pages indicator as event parameters. A DiskIOComplete event may indicate completion of a signal to read or write and may have a start page indicator and a number of pages indicator as event parameters.

The instrumentation of the database system code is the only portion of the prediction system that must be internal to the database system. The other components/modules may be located and/or run externally to the database system in a separate process or even different machine.

Demand Trace Extraction

A live system trace represents a combination of the workload demand, as well as the service process (i.e., the way resources were scheduled while running the workload). The trace from a live database system may be processed, such as by the demand extraction component 306 of FIG. 3, to extract a demand trace 308 which is independent of hardware speed and capacity.

Any suitable software of tool may be used to instrument and/or generate event traces. In one example, using information from control transfer and synchronization events corresponding to each request may be extracted from a highly interleaved event trace corresponding to multiple concurrent events. The resource usage (e.g., CPU, disk, network, and the like) consumed by each request may be determined as well. After extracting requests, a variety of techniques may be used to generalize or model the statistical properties of the requests, such as the control flow through the database system and/or resource consumption.

If the workload does not change, then the characteristics of this demand trace do not change since the demands placed by the workload on the database system are independent of the underlying hardware configuration. In this manner, the demand trace may be used as a basis for predicting database system behavior when the hardware configuration changes, such as CPU speed, disk bandwidth, memory size, and the like. The demand trace may contain events for individual actions, aggregated into relevant groups such as aggregate values for transaction types, and/or aggregated for all transactions.

In one example, the demand trace may include traces such as buffer reference trace, CPU consumption, interleaved demands of transactions, and the like. A buffer reference trace may include a trace of disk blocks referenced (read and/or written, synchronously and/or asynchronously) in the buffer cache. More particularly, demand accesses, read aheads, buffer touches, buffer dirties, log writes, new page creations, and the like may be included as part of a reference trace. In some cases, the reference trace may not include buffer eviction or I/O events since these events may depend on buffer pool size. CPU consumption may be measured in cycles, to be independent of the CPU clock speed. Given the traced context-switch events of active threads and cycle accurate timestamps of events, the number of processing cycles used by the workload may be sufficiently exactly computed. In this manner, CPU consumption in the demand trace may exclude CPU cycles used by other processes sharing the system with the database server. The transaction information may include the CPU, buffer, and/or I/O activity that represent the interleaved behavior of many transactions executing concurrently in the system, as well as background tasks such as cache management. By combining the information about stored procedure invocation, task identifiers, and scheduler context switches, the interleaved traces may be separated out. In this manner, each event and each cycle of computation of the demand trace may be associated with a specific transaction or to a background task. The transaction and/or background task may be identified in any suitable manner. For example, the event identifier may indicate the unique transaction or background task to differentiate that task from other tasks, may indicate a type of transaction and/or background task from a set of tasks, and the like.

The transaction may be grouped or typed in any suitable manner. Transactions of a defined type may be classified into groups based on any suitable label, division, and the like. For example, the transaction type may depend on which stored procedure call (pre-stored and compiled procedure in the database system) are invoked. Additionally or alternatively, transaction may be sorted based on other factors such as grouped by time to process, difference between actual processing time and average processing time, and the like. In one example, the transaction requests may be grouped according to the pattern of store procedure invocations. For example, a TPC-C 'new order' request corresponds to a single invocation of the store procedure proc_tpcc.neworder.

Hardware-dependent information may be extracted from the live system trace events. For example, the cache miss rate, the average I/O service time, the CPU clock speed, and the like may be extracted from the trace. The extracted hardware-dependent information may be used for scaling purposes, e.g., to test a virtual hardware configuration, such as new cache, disk memory, and/or new CPU. In this manner, prediction can be made of the new virtual hardware service time given the current hardware's service time.

Cache Simulator

One factor of database performance is disk I/O since disk reads affect both latency and throughput. The load placed on the disk subsystem by reads depends on the performance of the buffer cache, e.g., cache misses may cause disk reads. More particularly, the database system includes a buffer pool manager that is responsible for managing memory buffers used to store data read from storage, as well as for other purposes such as temporary working memory. If the main memory available for the buffer pool is too small, performance may be limited by the need to repeatedly read and write to the storage system.

To include the effects of the buffer pool performance in the performance evaluation of the database system, a cache simulator 312 may compute the behavior of a new (virtual) cache of the database system in response to the demand trace events 308 and the buffer pool parameters 310. For example, using at least a portion of the demand trace 308, the cache simulator may predict the behavior of a cache of based on cache parameters, such as a buffer pool size. For example, the cache simulator 312 may receive a virtual buffer pool size 310, and simulate the response of the virtual buffer pool size given the received demand trace. The demand trace may be pre-processed by the demand extraction component 306 and/or the cache simulator to extract a reference trace. More particularly, the reference trace, as input to the cache simulator may include buffer events, such as blocking (demand) accesses, non-blocking (prefetch) accesses, blocking (synchronous) writebacks, buffer dirties, buffer touches, and the like.

As noted above, the virtual buffer 310 may be any possible size which may be larger, smaller, or the same size as the actual buffer pool size of the existing database system. The cache parameters, such as the buffer pool size, may be provided to the cache simulator in any suitable manner and in any suitable form. For example, a database systems administrator may input the cache parameters to simulate a particular hardware configuration. Alternatively, the cache parameters may be automatically input by an optimization engine which may iterate through various hardware configurations and compare the performance of the configurations to improve database system management services.

The cache simulator may use the reference trace which indicates buffer accesses (both hits and misses) of the live system. These accesses may be linked to the transaction issuing the accesses. The cache simulator may compute which of the cache misses would become hits and which would become misses given a hardware configuration of the virtual buffer pool and a given eviction policy. It is to be appreciated that any suitable replacement policies and/or algorithms may be used. One example replacement policy of a cache simulator is global least recently used (LRU), which may approximate of a database server's actual cache replacement policy.

The cache performance may be predicted in any suitable manner. For example, analytic techniques such as the stack algorithm may be used to compute the hit ratio of an example LRU given a reference trace and cache size. However, the stack algorithm assumes a linear closed-loop reference trace. Thus, if concurrency significantly affects cache performance, the cache may be simulated to handle concurrency issues. It is to be appreciated that the cache simulator may use any cache model and not just simulate the I/O request stream. For example, the cache simulator may use a cache model based on stack depth analysis such as that discussed further in Mattson, et al., "Evaluation techniques for storage hierarchies," IBM systems Journal, vol. 9, no. 2, 1970, pp. 78-117, which is incorporated herein by reference.

The output 314 of the cache simulator 312 may indicate the behavior or response of the new buffer pool size to the reference trace in any suitable manner. For example, the cache simulator may replay the demand trace in the cache simulator to generate each access to the buffer pool and may annotate each reference to the buffer pool as a cache hit or miss. Each missed cache request may generate a read request to the I/O subsystem. Additionally or alternatively, the cache simulator output 314 may indicate one or more simulated cache eviction events, which may be annotated with whether the evicted buffer is clean or dirty. Eviction of a dirty buffer may cause the cache simulator to generate a write request to the I/O subsystem.

FIG. 6 illustrates a graph that represents example actual and simulated miss rates for a cache simulator. More particularly, the graph 600 plots the cache miss rate along axis 602 against the virtual buffer size along axis 604. The actual miss rate of a live database system is shown by curve 6060 and the simulated miss rate for the same demand trace is shown by curve 608.

Some portions of the buffer pool may be used for purposes other than database pages. For example, stored procedures, query plans, indexes, and other temporary memory objects may be stored in the buffer pool. These memory usages may be modeled by the cache simulator. Alternatively the trace events may include those events which allow the cache simulator and/or demand extraction component to observe the amount of allocation external to the database page cache. In this manner, the external allocation of the buffer pool is a workload characteristic independent of the total buffer pool size, which may held constant during the cache simulation. Accordingly, the simulated buffer pool is the buffer pool available for database page caching, and thus, the input buffer pool parameters 310 may be adjusted accordingly.

The database system also contains several background threads which perform activities such as opportunistic writeback of dirty buffers and maintaining a small number of buffers in a free buffer pool. Simulating the background thread activities may require simulating the thread scheduler, which may be sensitive to external factors such as the number of threads in the system, CPU utilization, and the like. In some cases, the background activity may occur during the idle time, i.e., when foreground tasks are not requesting buffer pages or generating I/O. During these idle periods, the workload performance is not limited by the buffer pool (i.e., it is mainly idle). Thus, these optimizations may affect performance for workloads that alternate between phases where the buffer pool is the bottleneck and phases where it is not the bottleneck. For this reason, the background activity may be ignored, or at least the effects may be assumed negligible.

In this manner, the cache simulator output 314 indicates simulated I/O access requests, write requests, and/or commit events in response to the reference trace in a given hardware configuration of the cache. More particularly, the cache simulator output 3124 of FIG. 3 may include demand reads such as blocking requests for pages not in the buffer pool, prefetch reads such as readahead requests for pages not in the buffer pool, writebacks of dirty pages to be evicted, and the like. In one example, the simulated output 314 includes a cache request indicator indicating an access request to information in the cache, a write request to the cache, and the like. Any suitable cache request indicator may used including an alpha-numeric string, a numeric value, a label, and the like. Each cache request indicating the type of cache request such as an access request may be associated with a success indicator which indicates if the cache access request was fulfilled (hit) or unfulfilled (missed). The success indicator may indicate a hit or miss in any suitable manner, including an alpha-numeric string, a numeric value, a label, and the like. Each success indictor which indicates 'missed' may be associated with a cache request indicator indicating a write request. The cache simulator output may also include a cache request indicator which indicates a write request for each eviction event in the simulated cache. The write request indicator may be associated with a buffer indicator which indicates whether the evicted buffer is clean or dirty. Any suitable buffer indicator may be used including an alpha-numeric string, a numeric value, a label, and the like. More over, the event parameters of trace events which identify the transaction generating the trace event may be propagated to the respective generated requests and/or commits generated by the cache simulator. Additionally or alternatively, the read/write requests generated by the cache simulator for the virtual hardware configuration may be summarized to an average per transaction and/or average per a given transaction type.

Disk Scaling

The simulated I/O requests 314 from the cache simulator 312 may be provided to a storage model component 316. The storage model component 316 may predict the performance of the simulated I/O requests on a virtual disk storage system. More particularly, given some amount of I/O performed on the existing storage system, the amount of time for the I/O requests to be processed may be determined for a different (virtual) storage hardware configuration. In this manner, the storage model component output 318 may output the determined I/O time 318 taken to satisfy each I/O request in the simulated I/O requests in a virtual hardware configuration. The I/O time to process may be determine for each transaction, and may be summarized for transactions of a particular type and/or for all transactions.

For example, the storage model component 316 may simulate a virtual storage disk having given storage parameters 320. The storage parameters may be provided in any suitable manner, such as input by a database systems administrator to simulate a particular hardware configuration to be modeled. Alternatively, the storage parameters may be automatically input by an optimization engine which may iterate through various hardware configurations and compare the performance of the configurations to improve database system management services. As noted above, the storage parameters defining the virtual disk storage may include the disk bandwidth which may be the same as or different from the disk parameters of the existing database system.

Any suitable storage model may be employed by the storage model component 316 for disk scaling, such as those for known physical parameters including those described by Denehy, et al., "Deconstructing storage arrays," Proc. Of the Architectural Support for Programming Languages and Operating systems Conference, Cot. 2004; Schindler, et al., "Lachesis: Robust Database Storage Management Based on Device-Specific Performance characteristics," Proc. 29th VLDB Conference, September, 2003; and Seltzer, et al., "Disk Scheduling Revisited," Proc. 1990 Usenix Winter conference, September, 2003, and those for unknown parameters such as those described by Anderson et al., "Simple Tool Modeling of Storage Devices," Hewlett-Packard Laboratories, 2001, SSP technical report HPL-SSP-2001-4; and Wang, et al., "Storage Device Performance Prediction with CART models," Proc. 12th Meeting of the IEEE/ACM International Symposium on Modeling, Analysis, and Simulation of computer and Telecommunications Systems, October 2004, which are all incorporated herein by reference.

In one example, the storage model may use an analytic linear model which may be appropriate for single spindle set-ups, and based on the Shortest Seek Time First (SSTF) scheduling algorithm used by typical disk device drivers. The storage model component may assume that the average service time for an I/O request may vary inversely with the disk bandwidth, where disk bandwidth is measured over a sequence of random accesses with no locality. Accordingly, the storage model component may perform disk scaling based on a large number of concurrent, independent request streams issuing I/Os. With these I/Os filtered through the buffer cache, there may be little spatial locality in the I/O request stream generated by buffer cache misses.

The storage model used by the storage model component 316 may predict the mean I/O service time $t_{io}$ as a function of the known disk parameters 320 such as number of cylinders, seek times, and the like and the mean I/O request queue length $q_{ave}$. The queue length value may depend on the workload and also on the buffer pool size. For example, larger buffer pools may generate fewer I/Os leading to shorter queues, which increases the service time per I/O. Accordingly, the queue length $q_{ave}$ may be predicted as a function of the buffer pool size. In one example, the queue length $q_{ave}$ may be determined by summing the average number of user connections blocked in I/O at any given time and the average number of outstanding I/Os for each such blocked connection. In this manner, the queue length may be determined using the following equation:

$$q_{ave} = (N_{users} - N_{CPU} - t_{think} * T)\left(\frac{N_{nonblocking}}{N_{blocking}} + 1\right) \quad (1)$$

where the $N_{users}$ is the number of user connections and $t_{think}$ is the mean think time, both of which are workload parameters which may be determined from the demand trace. $N_{CPU}$ is the expected number of running or runnable transaction threads, which for a non-preemptive CPU scheduler is the number of processors in the database system. The parameter $N_{blocking}$ is the number of blocking accesses and $N_{non-blocking}$ is the number of non-blocking accesses, both of which depend on the buffer pool size and may be computed from the cache simulator output. The parameter T is the transaction rate.

In this manner, the I/O service time $t_{io}$ may be determined as a function of the transaction rate T. For a closed loop, I/O bound workload, the transaction rate is a function of $t_{io}$. Accordingly, the mutual equations for $t_{io}$ and T may be solved numerically using any suitable iterative computation. For an open loop system, the transaction rate is constant, and may be determined from the demand trace.

While the number of buffer accesses of a foreground task may be independent of the underlying hardware, the background cache management activity may depend on the cache behavior, and hence the cache size, such as that simulated by the cache simulator. In this manner, the I/O time to process the background activity may be determined by the storage model component 318 given the storage parameters 320 and the I/O requests 314 from the cache simulator 312. For example, the number of dirty buffer evictions predicted by the cache simulator, the number of lazy disk writes, and the like may be received and simulated to determine the amount of time taken to process the received background events in the storage system having virtual parameters 320.

The storage model component may determine the I/O service time for the live database system with the actual hardware configuration in any suitable manner. For example, the storage model component may determined the I/O service time from the time stamps of events indicated in the demand trace.

CPU Scaling

The demand trace 308 may be processed by a CPU model component 322 to predict the performance on a CPU having a virtual hardware configuration. More particularly, given some amount of computation performed on one or more processors of the existing database system, the amount of time for the computation of the live trace may be determined for a different (virtual) processor. In this manner, the CPU model component output 324 may output the determined computation time taken to satisfy each computation in the demand trace and/or the background requests.

The CPU model component may include a model of locking, cache contention, and/or any other interactions between processors in a multiprocessor system. In this manner, the performance of the database system may be predicted when the virtual hardware configuration includes a different number of processors than the live hardware configuration. For example, the locks and latches within the database system may be traced as well as tracing the processor performance counters such as L2 cache misses. The tracing may be done in a sampling mode, which may reduce the overhead of tracing each and every locking and/or latching event.

In one example, the CPU model component may simulate one or more virtual processors having given virtual CPU parameters 326. The CPU parameters 326 may be provided in any suitable manner, such as input by a database systems administrator to simulate a particular hardware configuration to be modeled. Alternatively, the storage parameters may be automatically input by an optimization engine which may iterate through various hardware configurations and compare the performance of the configurations to improve database system management services. As noted above, the CPU parameters defining the virtual CPU may include the processor speed and/or the number of processors, which may be the same as or different from the CPU parameters of the existing database system.

Any suitable model may be employed by the CPU model component 322 for CPU scaling, such as a linear model. The CPU model component may assume that the number of cycles used by a computation remains constant across any processor. In this manner, the time taken for the computation may be inversely proportional to the processor speed in megahertz. The linear model may be replaced and/or extended to predict the effect of changing the CPU hardware, such as by modeling effects of memory access latency, instruction mixes, pipeline stalls, and the like. Other suitable CPU models are discussed further in Ailamaki et al, "DBMS on a modern processor: where does time go?," Proc. 25th VLDB Conference, September 1999; Barroso, et al., "Memory system characterization of commercial workloads," Proc. 25th International Symposium on Computer Architecture, June 1998; Marin, et al., "Cross-architecture performance predictions for scientific applications using parameterized models," Proc. International Conference on measurements and Modeling of Computer Systems 2004, June 2004; and Rosenblum, et al., "the impact of architectural trends on operating system performance," Proc. 15th ACM Symposium on Operating systems Principles, Dec. 1995, which are all incorporated herein by reference.

While the processor consumption of a foreground task may be independent of the underlying hardware, the background cache management activity may depend on the cache behavior, and hence the cache size, such as that simulated by the cache simulator. In one example, the cache management tasks may be assumed to incur a fixed amount of processing penalty per cache eviction. The computation penalty for a cache eviction may be computed from the measured CPU consumption of the cache management and the number of cache evictions in the output from the cache simulator. In this manner, given the predicted number of cache-evictions from the cache simulator, the CPU consumption of the cache management task may be determined.

The CPU consumption for the live system may be determined by the CPU model component in any suitable manner. For example, the CPU consumption of the live system may be determined by the time stamps of events indicated in the demand trace.

Throughput Prediction

Given a trace of a live system running a workload, the database server throughput under the same and/or a virtual hardware configuration may be predicted, such as by a throughput prediction module 328 of FIG. 3. The throughput of a database system is the number of transaction per unit time (e.g., seconds) that can be supported by that database system for a given workload. Thus, throughput may depend not only on the database system performance, but also the rate at which clients produce transaction requests to the database system. In this manner, database system performance and workload transaction rate depend on whether the workload is closed-loop or open loop.

In a closed-loop model, each concurrent user has at most one outstanding request at any time. After the transaction is completed, the user waits for some think time ($t_{think}$) before issuing the next request. Thus, the transaction rate or throughput depends on the workload's think time as well as the server's performance. In an open loop model, requests are issued independently of the completion of previous requests. In this manner, a fixed transaction request rate is independent of server performance.

The maximum (saturation) database server throughput means the database server throughput achieved by the server with a sufficiently large number of transactions that either the CPU, I/O or any other resource is 100% utilized. If the transaction rate of an open-loop workload exceeds this maximum throughput, then the database system is said to be in overload. Otherwise, the throughput of the database system is just the transaction rate in an open-loop system. In a closed loop system or saturated open-loop system, throughput may be determined by determining the throughput of individual factors, such as the CPU, I/O, and/or workload, and using bottleneck analysis to determine the throughput of the database system. Accordingly, performance metrics relevant to a database system administrator may include the closed-loop throughput for a given think time, the saturation throughput of the database system, the transaction response time (latency) and the like. In this manner, the closed-loop and/or saturation throughput of the live database system with the actual hardware configuration and/or the throughput of the database system with a virtual hardware configuration may be determined.

Throughput of the database system may depend on a bottleneck resource. For example, resources which may limit throughput include the I/O throughput, the CPU throughput, the workload, and the like. The I/O throughput ($T_{max/IO}$) is the rate at which the I/O subsystem can satisfy the I/O request stream from the buffer pool manager, which may be determined from the demand trace for the live hardware configuration and from the output of the cache simulator for the virtual hardware configuration. The throughput of the CPU ($T_{max/CPU}$) is rate at which the processor an execute the workload's computational demands. The throughput of the workload ($T_{max/workload}$) is the maximum transaction rate allowed by the workload itself due to "workload think time" (e.g., the sum of user think time, client processing, network delays, and the like).

Figure 4:
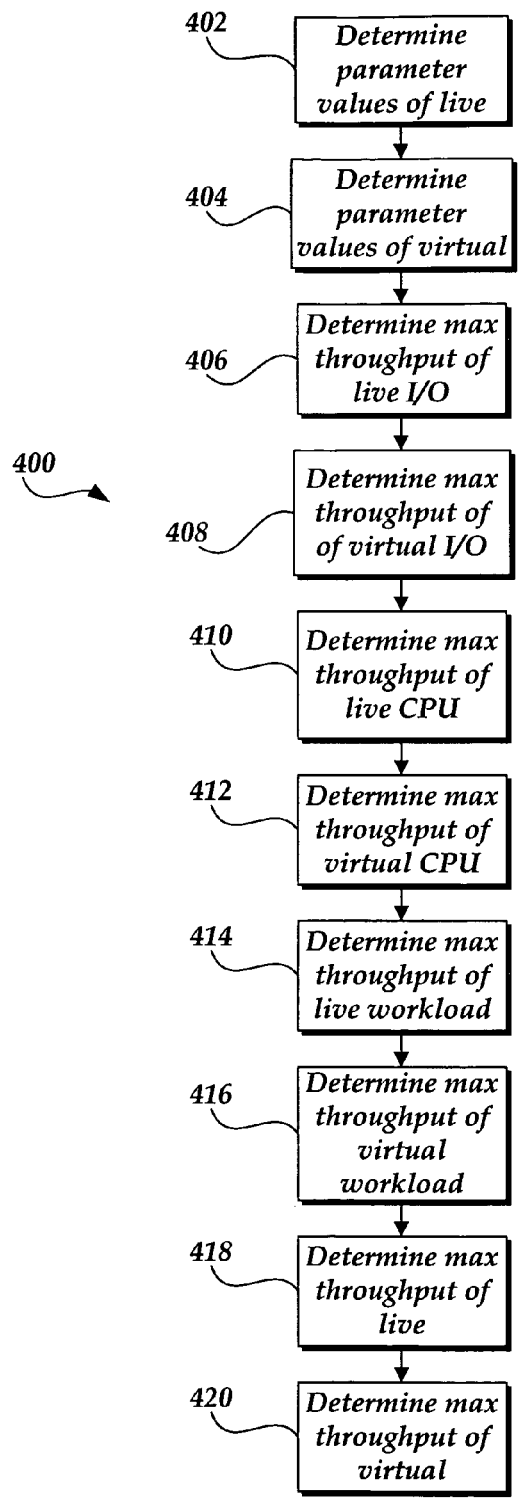
FIG. 4 illustrates a flow chart of an example methodology of determining throughput of a database system.

An example method 400 of throughput prediction is illustrated in FIG. 4. Initially, to determine the maximum server throughput, parameter values may be extracted 402 for the existing database system. The parameter values may be extracted from the demand trace and/or known hardware parameters of the database system. Example parameter values which may be extracted include CPU clock speed ($P_{cpu}$) which may be in cycles per second, average I/O service time ($t_{io}$) which may be in seconds (e.g., the total disk busy time divided by the number of I/Os completed in that time), buffer cache size (B), the average CPU computation per transaction ($c_{compute}$) which may be in cycles, the number of buffer cache misses per transaction (m) which may include demand and/or prefetch misses per, the number of new buffers (p) allocated per transaction, the average CPU computation overhead per cache block replacement ($c_{lazy}$) which may be determined as the total CPU computation in the cache manager thread divided by the number of buffer cache evictions pre transaction, which in steady state may be assumed to be the buffer cache misses m plus the number of new allocated buffers p, the fraction of evicted blocks (e) that are dirty and must be written back, the number of commit (synchronous) writes (w) per transaction, the average number I/O requests per transaction $n_{io}$, and the like.

Parameter values may be determined 404 for the virtual database system with the new, virtual hardware configuration. The parameter values may be extracted from the output of the cache simulator, the output of the storage model component, the output of the CPU model component, and/or the known hardware parameters of the virtual hardware (e.g., the inputs to the cache simulator, the storage model component, and/or the CPU model component).

For example, the virtual (new) hardware configuration may have a CPU speed ($P'_{cpu}$) which may be the input processor speed 326 (shown in FIG. 3) or may be the same as the existing CPU speed $P_{cpu}$. Additionally or alternatively, the virtual hardware may have a new average I/O service time ($t'_{io}$) which may be determined from the storage model output 318 (shown in FIG. 3) or may be the same as the existing database system IO service time $t_{io}$. Additionally or alternatively, the (new) virtual hardware configuration may have a buffer cache size B', which may be determined from the buffer pool size 310 (shown in FIG. 3) input to the cache simulator or may be the same as the existing database system buffer size B. Using the data about the virtual hardware system, the parameter values may be determined 404, such as the average CPU computation per transaction ($c'_{compute}$) which may be in cycles, the number of buffer cache misses per transaction (m') and may include demand and/or prefetch misses, the number of new buffers (p') allocated in the virtual database system, the CPU overhead per cache block replacement ($c'_{lazy}$), the fraction of evicted blocks (e') that are dirty and must be written back, the number of commit (synchronous) writes (w') per transaction, the average number of I/O requests per transaction ($n'_{io}$), and the like.

In one example, the amount of computation per transaction ($c'_{compute}$), lazy write computation per cache eviction ($c'_{lazy}$), and/or the number of commit writes per transaction (w') may stay unchanged. In this manner, $c'_{compute}=c_{compute}$, $c'_{lazy}=c_{lazy}$, and w'=w. The parameters values for the number of buffer cache misses per transaction (m'), the fraction of evicted blocks that are dirty and must be written back (e'), and the average number of I/O requests per transaction ($n'_{io}$) may be obtained from the cache simulator results. For example, as shown in FIG. 3, the cache simulator 312 may provide those parameter values in its I/O request output 314.

With reference to the method 400 of FIG. 4, using the determined parameter values for the existing hardware configuration of the live database system, the maximum throughput of the live I/O system like can be determined 406.

The maximum throughput of the I/O subsystem may be determined in any suitable manner. For example, maximum throughput $T_{max/IO}$ for the live I/O may be determined using the equation:

$$T_{max/IO} = \frac{1}{n_{io} t_{io}} \quad (2)$$

In this manner, only I/Os to the main database tables may be considered since the transaction log may be stored separately and may not be a bottleneck.

Alternatively, the maximum throughput of the I/O subsystem may be determined using the equation:

$$T_{max/IO} = \frac{1}{t_{io}(m(1+e)+w)} \quad (3)$$

In a similar manner, the maximum possible throughput of the virtual I/O as a function of the determined parameters values for the virtual hardware configuration may be computed 408.

The maximum throughput of the CPU subsystem may be determined 410 in any suitable manner. For example, the maximum throughput of the CPU subsystem $T_{max/CPU}$ may be determined using the equation:

$$T_{max/CPU} = \frac{P_{CPU}}{c_{compute} + c_{lazy}(m+p)} \quad (4)$$

Alternatively, the maximum throughput of the CPU subsystem may be determined using the equation:

$$T_{max/CPU} = \frac{1}{t_{CPU}} \quad (5)$$

where $t_{CPU}$ is the average amount of CPU time per transaction. The average amount of CPU time per transaction may assume that each transaction will generate the same amount of computation independent of buffer pool size. The average amount of CPU time per transaction $t_{CPU}$ may be an output of the CPU model component for the virtual hardware configuration and/or determined from the demand trace for the live system.

In a similar manner, the maximum possible throughput $T'_{max/CPU}$ of the virtual CPU as a function of the determined parameters values for the virtual hardware configuration may be computed 412.

The maximum throughput of the workload may be determined 414 in any suitable manner. The maximum throughput of the workload ($T_{max/workload}$) of an open-loop workload is simply its known constant transaction rate T. For a closed-loop workload, the maximum throughput of the workload ($T_{max/workload}$) may be determined using the equation:

$$T_{max/workload} = \frac{N_{users}}{t_{think}} \quad (6)$$

where $N_{users}$ is the number of concurrent users and $t_{think}$ is the mean workload think time.

In a similar manner, the maximum possible throughput of the workload in the virtual hardware configuration may be computed 416.

The maximum server throughput for a hardware configuration (live or virtual) may be determined 418 in any suitable manner, such as using bottleneck analysis to determine if the disk, CPU, and/or workload is the bottleneck. For example, the maximum server throughput of the live database system hardware configuration may be determined using the following equation $$T_{max} = \min(T_{max/IO}, T_{max/CPU}, T_{max/workload}) \quad (7)$$

The maximum server throughput $T'_{max}$ of the virtual hardware configuration may be determined 420 using equation (7) and inserting the determined individual system throughput values for the virtual hardware configuration.

An example graph 700 illustrating bottleneck analysis for an example OLTP workload for various hardware configurations is shown in FIG. 7. More particularly, the transactions per second are illustrated along axis 702 and the buffer pool size is illustrated along axis 704. The maximum throughput of the CPU ($T'_{max/CPU}$) is illustrated by curve 706; the maximum throughput of the I/I ($T'_{max/IO}$) is illustrated by curve 708; the maximum throughput of the workload ($T'_{max/workload}$) is illustrated by curve 710; and the maximum throughput of the server ($T'_{max}$) is illustrated by curve 712.

Latency Prediction

Another performance indicator may include the latency of a transaction. Latency may be the response time of the database system which may be measured as the time between the database receiving a transaction request and sending out a response after committing or aborting the transaction. In one example, all external delays to the database system performance of the transaction, e.g., client-side processing time, network queuing, and the like, may be viewed as part of the workload think time from the viewpoint of the server or may be ignored.

Unlike throughput, response time depends not only on overall resource usage, but also on the critical path resource usage. In this manner, the demand trace may include sufficient information to extract the critical path of each traced transaction. In the general case, response time may be predicted by modeling the interleaving and the scheduling interactions when these transactions are run concurrently.

Depending on the database system implementation, there are a variety of factors that may contribute to transaction response time. For example, locking can contribute to delay on a database system with 2-phase locking-based concurrency control. These locking and other delays may be extracted and/or determined from the event information in the event trace. In one example, latency analysis may focus on delays due to waiting for hardware resources, e.g. CPU and/or I/O blocking time.

The latency of a transaction may be predicted in the database system such as by a latency predictor 330, shown in FIG. 3. For example, when the database server is saturated (at maximum throughput), average latency may be determined for a virtual hardware configuration given the predicted throughput and the level of concurrency (which may be the number of active client connections). Latency may also be predicted in other cases, such as when the server is not at maximum throughput, for a specific transaction, for a specific transaction type, for all transactions, and the like. In this manner, latency may be determined at any suitable level of detail.

Figure 5:
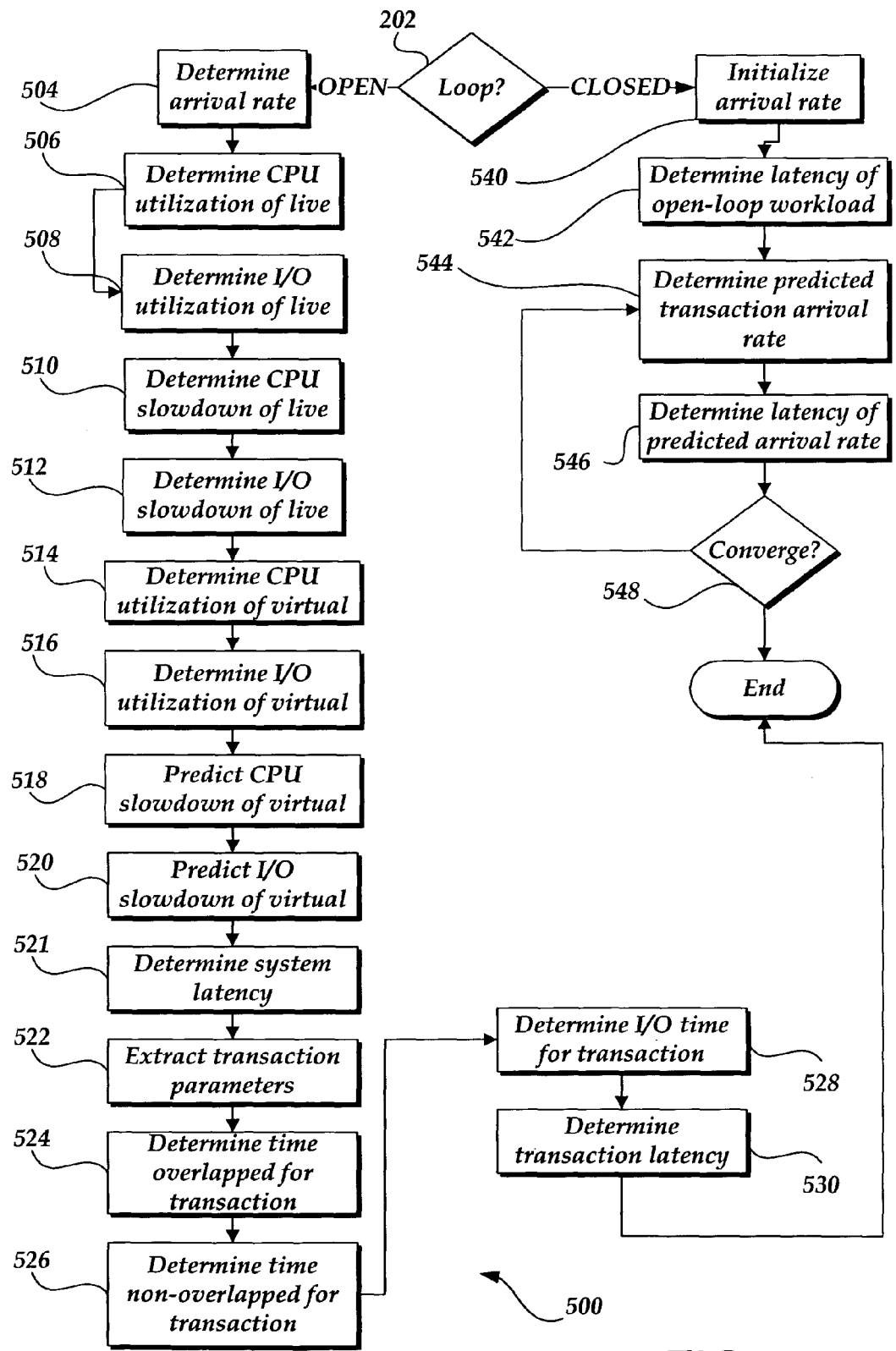
FIG. 5 illustrates a flow chart of an example methodology of determining latency in a database system.

FIG. 5 illustrates an example method 500 of determining the latency of a transaction type. The analysis of the latency of a transaction may be determined if the input workload is open or closed loop. Latency prediction for the virtual hardware configuration may assume that the input workload is the same as for the live system, either open or closed-loop. Accordingly, the workload may be examined 502 to determine if the workload is open loop or closed loop.

Changing the hardware configuration of a database system, such as the buffer pool size of the cache, may cause some transaction type to go faster relative to other transaction types. Accordingly, in a closed-loop model, the virtual hardware configuration may cause some request streams to go faster than other request streams if they different transaction misses. To simplify prediction, all request streams may be assumed to have the same transaction mix, or the workload may be assumed to be open-loop, which may prevent request streams from speeding up arbitrarily.

Open Loop Workload

In an open loop workload, the transaction arrival rate of the live database system is fixed, e.g., is independent of server latency. The open loop transaction rate of the live system may be determined 504 using any suitable process or approximation. For example, the fixed transaction rate (T) may equal the inverse of the time between transaction arrivals (t), and the fixed transaction rate is less than the maximum transaction rate ($T_{max}$), and may shown in equation form as:

$$T = 1/t < T_{max} \quad (8)$$

To determine the transaction latency of each transaction type in the live (existing) database system hardware configuration, the utilization of the live CPU subsystem may be determined 506 using any suitable process or technique. For example, the utilization of the CPU subsystem ($U_{cpu}$) may be computed using the following equation:

$$U_{cpu} = \frac{c_{compute} + c_{lazy}(m + p)}{P_{cpu}t} \quad (9)$$

where $P_{cpu}$ is the processor speed of the existing CPU, $c_{compute}$ is the amount of computation per transaction in the live database system, $c_{lazy}$ is the CPU overhead per cache block replacement for the live database hardware configuration, m is the number of buffer cache misses per transaction in the live database system, p is the number of new buffers allocated per transaction in the live database system, and t is the average time between transactions in the live database system, e.g., the inter-arrival time of transactions.

The utilization of the live I/O subsystem may be determined 508 using any suitable process or technique. For example, the utilization of the I/O subsystem ($U_{io}$) may be computed using the following equation:

$$U_{io} = \frac{t_{io}(m(1 + e) + w)}{t} \quad (10)$$

where $t_{io}$ is the average I/O service time in the live database system, m is the number of buffer cache misses per transaction in the live database system, e is the fraction of evicted blocks that are dirty and must be written back in the live database system, w is the number of commits (synchronous) writes per transaction in the live database system, and t is the average time between transactions in the live database system.

The average CPU scheduling slowdown across all threads in the live database system may be determined 510 in any suitable manner. The average CPU scheduling slowdown is the ratio of time spent runnable or running on the CPU to the time spent actually running on the CPU, and may be measured in seconds per cycle. More particularly, the average CPU slowdown across all threads ($S_{cpu}$) may be computed according to the following equation:

$$S_{cpu} = \frac{T_{running} + T_{runnable}}{T_{running}} \quad (11)$$

where $T_{running}$ is the total running time for all threads and $T_{runnable}$ is the total running and runnable time for all threads.

The average I/O slowdown across all I/Os may be determined 512 for the live database system in any suitable manner. For example, the average I/O slowdown across all I/Os ($S_{io}$) may be computed for each transaction according to the following equation:

$$S_{io} = \frac{t_{iowait}}{t_{io}} = \frac{t_{io} + t_{io\,queuing\,delay}}{t_{io}} \quad (12)$$

where $t_{iowait}$ is the average total time per I/O in the live database system, $t_{io}$ is the average I/O service time in the live database system and $t_{ioqueuingdelay}$ is the average I/O queuing delay in the live database system. More particularly, queuing delay is the amount of time from an I/O being issued to the time that the storage system begins to service the I/O, and the service time is the time from that point on until the I/O is completed.

In a similar manner, the expected utilization of the virtual hardware configuration may be determined. More particularly, the expected utilization of the virtual CPU may be determined 514. For example, the expected utilization of the virtual CPU $U'_{cpu}$ may be determined in a manner similar to equation (9) above using:

$$U'_{cpu} = \frac{P'_{cpu}(c'_{compute} + c'_{lazy}m')}{t} \quad (13)$$

where $P'_{cpu}$ is the processor speed of the virtual CPU, $c'_{compute}$ is the amount of computation per transaction in the virtual database system, $c'_{lazy}$ is the CPU overhead per cache block replacement for the virtual hardware configuration, m' is the number of buffer cache misses per transaction in the live database system, and t is the average time between transactions in the live database system.

The expected utilization of the virtual I/O may be determined 516. For example, the expected utilization of the virtual I/O $U'_{io}$ may be determined in a manner similar to equation (10) above using:

$$U'_{io} = \frac{t'_{io}(m'(1+e')+w')}{t} \quad (14)$$

where $t'_{io}$ is the average I/O service time in the virtual database system, m' is the number of buffer cache misses per transaction in the virtual database system, e' is the fraction of evicted blocks that are dirty and must be written back in the virtual database system, w' is the number of commit (synchronous) writes per transaction in the virtual database system, and t is the average time between transactions in the live database system.

The CPU slowdowns in the virtual hardware configuration of the database system may be predicted 518 in any suitable manner. For example, if a large number of concurrent, independent, identical request streams exist, then transaction arrival times may be assumed independent. In this manner, the prediction of new slowdowns $S'_{cpu}$ in the CPU may be determined using the following equation:

$$S'_{cpu} = S_{cpu} \frac{1-U_{cpu}}{1-U'_{cpu}} \quad (15)$$

where $S_{cpu}$ is the slowdown in the live database CPU, $U_{cpu}$ is the CPU utilization in the live database system, and $U'_{cpu}$ is the expected CPU utilization in the virtual hardware configuration of the database system.

The I/O slowdowns in the virtual hardware configuration of the database system may be predicted 520 in any suitable manner. For example, if a large number of concurrent, independent, identical request streams exist, then transaction arrival times may be assumed independent. In this manner, the prediction of new slowdown $S'_{io}$ in the I/O may be determined using the following equation:

$$S'_{io} = S_{io} \frac{1-U_{io}}{1-U'_{io}} \quad (16)$$

where $S_{io}$ is the I/O slowdown in the live database system, $U_{io}$ is the utilization of the I/O in the live database system hardware configuration, and $U'_{io}$ is the expected utilization of the virtual I/O in the virtual hardware configuration.

In this manner, the average latency of the transactions may be determined 521. For example, the following equation may be used to determine the latency L of the live database system, where a is the number of blocking buffer cache misses per transaction and w is the number of blocking (synchronous) writes:

$$L = S_{cpu}P_{cpu}(c_{compute}+c_{lazy}*(m+p))+S_{io}t_{io}(a+w) \quad (17)$$

In a similar manner, the Latency L' of the average latency of transaction in the virtual database system may be determined, substituting in the determined virtual parameters into equation (17).

Although the above example determines the average latency for all transactions, it is to be appreciated that the example above may be expanded to determine the latency of a particular transaction X. More particularly, the average latency of a particular transaction or transaction type may be determined, as opposed to the average latency across all transactions. In this manner, the transaction X may be any transaction and/or a particular type of transaction. As noted above, the type of transaction may be determined in any suitable manner, such as by the remote procedure call, and the like.

Using the predicted CPU and/or I/O slowdown in the virtual hardware configuration of the database system, the demand traces, and cache simulation output, the exact behavior of each transaction in the workload may be predicted. More particularly, the resource consumption that occurs on the critical path (i.e., in the same thread of control) for an individual transaction may be extracted from the trace. The behavior may be determined in terms of the amount of computation, amount of I/O, and/or the way the transactions are overlapped. For example, given the predicted CPU and I/O slowdown factors, the time required for each segment of CPU and I/O may be simulated, and thus the latency of the entire transaction may be determined. However, in many cases an analytic approach to latency prediction may be cheaper and easier.

In one example, parameter values may be determined for each transaction X, which may be in addition to or alternative to the average parameter values discussed above. More particularly, the transaction X may be a specific, individual transaction in the workload or may be type of transaction. For example, the extracted parameter values may be those for a particular, individual transaction, or may be an average of the individual values for individual transactions of a particular type. The extracted parameters may be used to determine the latency of the transaction X.

With reference to the method shown in FIG. 5, the transaction specific parameters for an individual transaction X may be extracted 522. The extracted transaction specific parameters for an individual transaction X may include the number of CPU cycles of computation executed by the transaction in the live database system ($c_{compute/X}$), the number of demand misses ($m_X$) incurred by the transaction X in the live database system, the number of new buffers ($p_X$) allocated by the transaction X in the live database system, the number of commit (synchronous) writes ($w_X$) in the transaction X in the live database system, the total latency ($L_X$) of the transaction X in the live database system, and the like.

The number of CPU cycles of computation executed by the transaction in the live database system ($c_{compute/X}$) is the cycles of computation executed by the transaction X in the live database system as indicated by the trace events and may be determined in any suitable manner. For example, the number of CPU cycles may be divided up depending on whether the computation was potentially overlapped with I/O (e.g., a prefetch was issued but the corresponding blocking access was not yet reached); and/or whether the time was spent in transaction code or in "helping" the cache manager task to replenish the free buffer list. Accordingly, the computation time for a specific transaction may be illustrated mathematically as the sum of the overlapped computation ($c_{overlapped}$) and the non-over-lapped computation ($c_{non-overlapped}$):

$$c_{compute/X} = c_{overlapped} + c_{non-overlapped} \quad (18)$$

The overlapped computation and non-overlapped computation may be determined in any suitable manner. For example, the overlapped computation cycles ($c_{overlapped}$) for a specific transaction may be mathematically represented by the sum of the overlapped computation for the transaction ($c_{overlapped/trans}$) plus the overlapped computation in helping the cache manager task ($c_{overlapped/helper}$), such as by helping the cache manager replenish the free buffer list, as represented in the following equation:

$$c_{overlapped} = c_{overlapped/trans} + c_{overlapped/helper} \quad (19)$$

In a similar manner, the non-overlapped computation cycles ($c_{non-overlapped}$) for a specific transaction may be mathematically represented by the sum of the non-overlapped computation for the transaction ($c_{non-overlapped/trans}$) plus the non-overlapped computation in helping the cache manager task ($c_{non-overlapped/helper}$), such as by helping the cache manager replenish the free buffer list, as represented in the following equation:

$$c_{non-overlapped} = c_{non-overlapped/trans} + c_{non-overlapped/helper} \quad (20)$$

Based on the determined computation cycles, the time that the computation is overlapped ($T_{overlapped}$) for a transaction X may be determined 524, such as by using the following equation:

$$T_{overlapped} = S_{CPU} * P_{cpu} * c_{overlapped} \quad (21)$$

where $S_{CPU}$ is the CPU scheduling slowdown in the live database system, $P_{cpu}$ is the CPU clock speed in the live database system hardware configuration, and $c_{overlapped}$ is the overlapped computation cycles for the transaction X, such as that determined by equation (19) above.

Similarly, the time that the computation is not overlapped ($T_{non-overlapped}$) for a transaction X may be determined 526, such as by using the following equation:

$$T_{non-overlapped} = S_{CPU} * P_{cpu} * c_{non-overlapped} \quad (22)$$

where $S_{CPU}$ is the CPU scheduling slowdown in the live database system, $P_{cpu}$ is the CPU clock speed in the live database system hardware configuration, and $c_{non-overlapped}$ is the non-overlapped computation cycles for the transaction X, such as that determined by equation (20) above.

The I/O time (including queuing delays) ($t_{ioX}$) for a transaction X may be determined 528 in any suitable manner, such as by the following equation:

$$t_{ioX} = S_{io} * t_{io}(a_X + w_X) \quad (23)$$

where $S_{io}$ is the average I/O slowdown for all transactions, $t_{io}$ is the average I/O service time for all transactions, $a_X$ is the number of blocking buffer cache misses in the transaction X, and $w_X$ is the number of synchronous writes for the transaction X.

For a given transaction X, the time of overlapped computation, the time of non-non-overlapped computation, and I/O time may be used to determine 530 the latency of the transaction X in the live database system. Any suitable method, process or technique may be used to determine the latency. For example, the determined parameter values of the time of overlapped computation, the time of non-overlapped computation, and I/O time may be fit to a linear model, such as shown in the following equation:

$$L_X = \alpha_0 * T_{non-overlapped} + \alpha_1 * T_{overlapped} + \alpha_2 * t_{io} + \alpha_3 * \max(T_{overlapped}, t_{io}) \quad (24)$$

The linear coefficients ($\alpha_0$, $\alpha_1$, $\alpha_2$, and $\alpha_3$) may be iteratively determined such as by using least-squares regression, i.e., minimizing the sum of the squares of the residuals.

Given a new hardware configuration, the new parameter values for a transaction X may be determined. With reference to the method shown in FIG. 5, extracting 522 transaction parameters may include determining the transaction parameters for the virtual system. For example, the cache management overhead may be scaled, such as by assuming that the amount of cache management processing done by the transaction is proportional both to the number of cache replacements caused by the transaction itself, as well as the total cache replacement rate. In this manner, the amount of cache management ($r_{lazy}$) done by a transaction X may be determined using:

$$r_{lazy_X} = \frac{(m'_X + p'_X)(m'_{workload} + p'_{workload})}{(m_X + p_X)(m_{workload} + p_{workload})} \quad (25)$$

where $m'_X$ is the average number of buffer cache misses per transaction with the virtual hardware configuration, $p'_X$ is the number of buffers allocated per transaction in the new hardware configuration, $m_X$ is the average number of buffer cache misses per transaction with the live hardware configuration, $p_X$ is the number of existing buffers allocated in the live hardware configuration, $m_{workload}$ is the total number of demand misses observed in the trace, $m'_{workload}$ is the corresponding prediction from the cache simulator of the total number of demand misses in the new hardware configuration, and $p'_{workload}$ and $p_{workload}$ are similarly the total number of buffer allocations in the entire trace for the virtual and live hardware configurations respectively.

The over-lapped and non-overlapped computation cycles, time overlapped and non-overlapped, and time of I/O may be determined 524, 526, 528 for the transaction X in the virtual hardware configuration. For example, the following equations maybe used in a manner similar to equations (19)-(23) above:

$$c'_{overlapped} = c_{overlapped/trans} + r_{lazy} * c_{overlapped/helper} \quad (26)$$

$$c'_{non-overlapped} = c_{non-overlapped/trans} + r_{lazy} * c_{non-overlapped/helper} \quad (27)$$

$$T'_{overlapped} = S'_{cpu} * P'_{cpu} * c'_{overlapped} \quad (28)$$

$$T'_{non-overlapped} = S'_{cpu} * P'_{cpu} * c'_{non-overlapped} \quad (29)$$

$$t'_{ioX} = S'_{io} * t'_{io}(a'_X + w'_X) \quad (30)$$

From the determined values of over-lapped and non-overlapped computation cycles, time overlapped and non-overlapped, and time of I/O, the latency of the transaction X may be determined 530 under the features and/or limitations of the virtual hardware configuration. For example, the determined values may be fit to a linear model to determine the latency $L'_X$ of a transaction X in the virtual hardware configuration, such as by using the following equation:

$$L'_X = \alpha'_0 * T'_{non-overlapped} + \alpha'_1 * T'_{overlapped} + \alpha'_2 * t'_{io} + \alpha'_3 * \max(T'_{overlapped}, t'_{io}) \quad (31)$$

The linear coefficients ($\alpha'_0$, $\alpha'_1$, $\alpha'_2$, and $\alpha'_3$) may be iteratively determined such as by using least-squares regression, i.e., minimizing the sum of the squares of the residuals.

Alternative to the method shown in FIG. 5, the average latency for a transaction X in the live database hardware configuration may be determined in a manner similar to the average latency for all transactions of equation (17), such as by using the following equation:

$$L_X = S_{CPU} * P_{cpu}(c_{compute} + c_{lazy} * (m_X + p_X)) + S_{io} t_{io}(a_X + w_X) \quad (32)$$

In a similar manner, the average latency for a transaction X ($L'_X$) for the virtual hardware configuration may be determined using equation (32) above and inserting the determined extracted and determined parameters for the virtual hardware configuration.

In another example alternative to the determining the latency of the virtual hardware configuration shown in equation (31) above, the critical path CPU time for each transaction X in the virtual hardware configuration may be assumed to be independent of buffer pool size. Since I/O blocking time varies with buffer pool size, the I/O blocking time may be predicted in any suitable manner. For example, the I/O blocking time may be assumed proportional to the number of blocking I/Os issued per transaction X, which may be predicted by the cache simulator. The I/O may also be assumed proportional to the average I/O response time including queuing delay. Queuing delay may be inversely proportional to the storage system idleness. Idleness may be computed from the storage system utilization, which is proportional to the total amount of I/O traffic. In this manner, the predicted mean latency for a transaction X may be determined using the following equation:

$$L'_X = t_{X/CPU} + b'_{X/io} d_{io} \frac{1 - U_{io}}{1 - U_{io} \frac{N_{io}}{N'_{io}}} \quad (33)$$

where $t_{X/CPU}$ is the mean critical path computation time for transaction X and may be determined from the live system trace, $d_{io}$ is the overall mean blocking time per blocking I/O and may be determined from the live system trace, $U_{io}$ is the I/O subsystem utilization and may be determined from the live system trace, $N_{io}$ is the overall number of I/Os issued per transaction and may be determined from the live system trace, $b'_{X/io}$ is the predicted number of blocking I/Os per transaction X and may be included in or derived from the output of the cache simulator, and $N'_{io}$ is the predicted overall number of I/Os per transaction and may be included in or derived from the cache simulator output.

Closed Loop Workload

With a closed loop workload as determined at step 502 of FIG. 5, the arrival rate may be determined as a fixed think time ($t_{think}$) between transactions, as opposed to a fixed arrival time of the open loop system. In this manner, each request stream may wait for the current transaction to complete, wait for some time (think time) and then issue the next request. In the closed-loop case, the latency may be predicted using the method described above with reference to open loop system by initializing 540 the non-fixed arrival rate T' equal to a fixed arrival rate T, such as the observed average arrival rate. The latency (L') of the virtual hardware configuration may be determined 542 as described above. The predicted arrival rate T' may then be updated using:

$$\frac{1}{T'} = \frac{L' + t'_{think}}{N'_{conc}} \quad (34)$$

where L' is the determined average latency across all transactions of the live database system workload on the virtual hardware configuration, $N'_{conc}$ is the number of independent, concurrent (identical request streams) in the virtual hardware configuration, and $t'_{think}$ is the average think time in the virtual hardware configuration. The average think time ($t'_{think}$) in the virtual configuration may be assumed equal to the average think time of the live database system ($t_{think}$), which may be extracted from the trace. The number of independent, concurrent closed loops ($N'_{conc}$) of the virtual hardware configuration may be assumed equal to the number of independent, concurrent closed loops in the live database system ($N_{conc}$), and may be extracted from the trace.

The average latency across all transactions of the virtual hardware configuration may be determined in any suitable manner, such as by using equation (32) above. However, the average CPU slowdown in the virtual hardware configuration ($S'_{cpu}$) and the I/O slowdown ($S'_{io}$) of the virtual hardware configuration depend on the predicted utilization of the CPU ($U'_{cpu}$) and the utilization of the I/O ($U'_{io}$) of the virtual hardware configuration, which in turn depend on the arrival rate T'. Accordingly, the third-degree equation (equation (34)) in T' may be determined in any suitable manner, either analytically or numerically. For example, the transaction rate may be determine 544 and the latency for that transaction rate may be determined 546 and solved numerically until the transaction rate T' converges 548 with the desired accuracy, and the average latency L' for that arrival rate T' may be recomputed using equation (34) above. As noted above with respect to the open-workload example, the general aspects of the average latency for all transactions may be expanded to analyze the latency for an individual transaction and/or for a particular transaction type.

Visualization

The prediction system may output throughput and/or latency performance data in any suitable manner. For example, the prediction system 108 of FIG. 3 may include a visualization component 336 which may process the information from the live trace, virtual trace (e.g., from the cache simulator), throughput component, and/or latency component to generate graphics which may be displayed such as on a computer screen.

For example, the detailed end-to-end tracing provided by the instrumentation may provide information about current system performance and may be represented in any suitable manner to help administrators to understand system performance. An example graphic of an end-to-end trace is illustrated in FIG. 11.

In addition to the existing performance counter provided by the database management system, the virtual performance counters (e.g., those generated in modeling and simulating the virtual hardware configuration) may be provided such as the mean amount of CPU time used by a transaction X or all transactions. These performance values may be plotted in a graph opposite various virtual hardware configurations, such as those illustrated in FIGS. 6-11 and 14.

Since the instrumentation provides a detailed, low-level trace of events, new virtual performance counters may be added without further modification to the database management code. For example, one the resource multiplexing points (CPU scheduling, buffer page access, etc) are correctly instrument for each resource of interest, any measure related to performance or resource usage may be derived by adding the appropriated logic to the prediction system to evaluate that performance counter. Thus, in one example, by tracing the kernel and database system context switches, the CPU time spent by any thread may be determine at any time. From the StartRequest and EndRequest events discussed above, the request being worked on by a thread may be determined. The EnterStoredProc and ExitStoredProc events may indicate if the 'neworder' stored procedure was invoked while processing the request. By combining these, the mean CPU time used by neworder may be derived. In this manner, the administrator may selectively investigate any minute portion of the database system performance which may be derived from the trace without modifying the database system code.

For example, the visualization component may output a view of buffer page locality, e.g., a distribution plot of page temperature (access frequency) against the number of pages having that temperature. An example view of buffer page locality is illustrated in FIG. 10 and was determined from the trace event information. More particularly, the page identifiers in the page access events of the trace may be used to separate the distributions by table. FIG. 10 illustrates that different tables may have different distributions, e.g., some have sharp 'cliff' indicating that accessing these tables may become significantly faster on average once its working set is resident in memory. While this is not the only way to visualize buffer cache performance, FIG. 10 illustrates the use of the trace event data to generate visualizations with any desired level of detail.

In addition or alternative to summary views, the behavior of a single transaction may be examined as it ran concurrently with a large number of other transactions. An example end-to-end trace (or timeline) of a single transaction is illustrated in FIG. 14. The timeline 1400 of FIG. 14 illustrates the resource demand behavior of the particular transaction, which was extracted from a highly interleaved execution of many concurrent transactions.

Artificial Intelligence

The database management system may include an artificial intelligence component 334. The artificial intelligence component 334 may employ one or more various artificial intelligence based schemes for carrying out various aspects thereof. The artificial intelligence component may analyze the trace data as training data and may suggest hardware changes to the system administrator. The artificially intelligence component may use any suitable technique or process to determine hardware configurations which improve or optimize performance of the database system.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, the prediction system can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically perform a number of functions.

Example Computing Device

Figure 12:
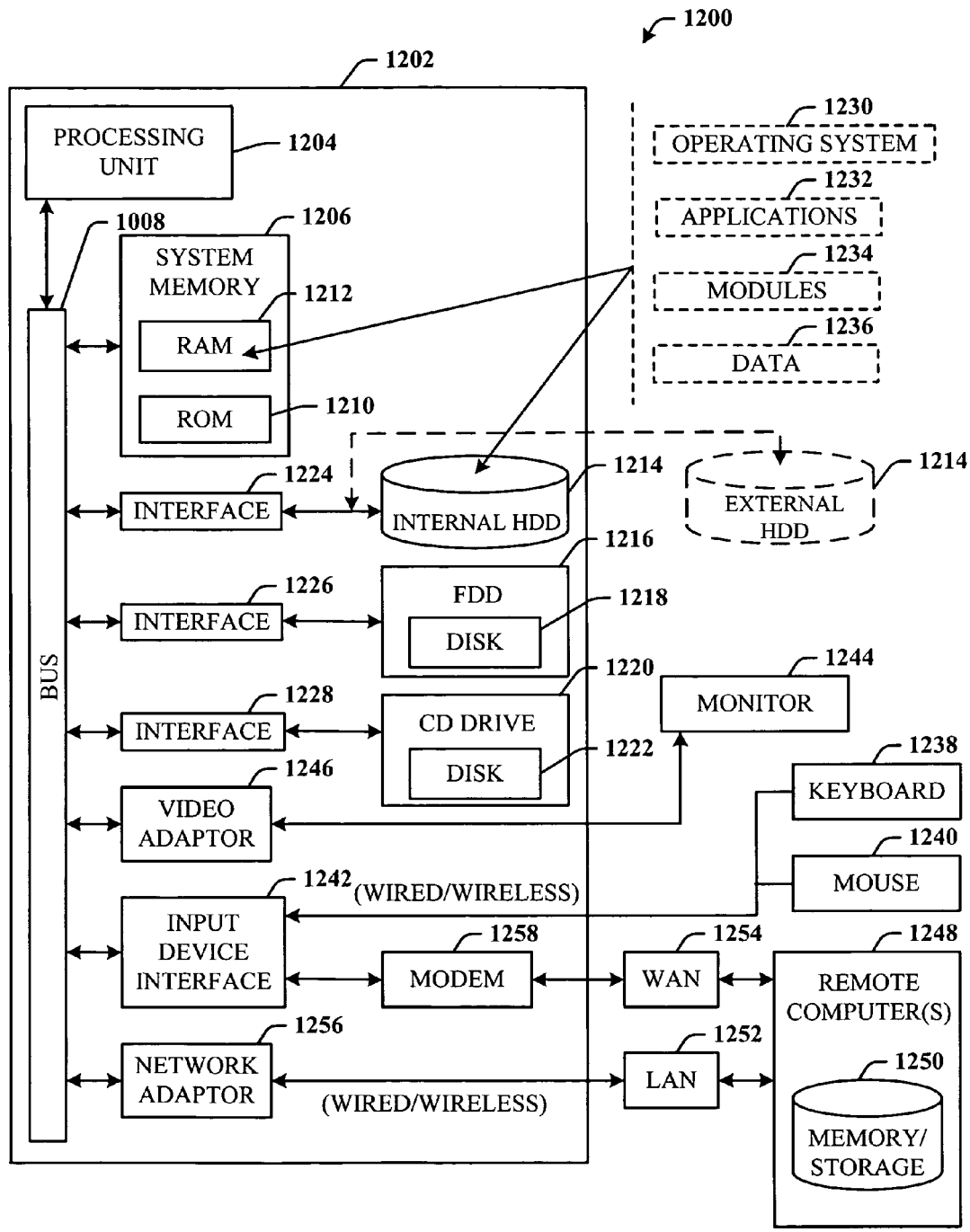
FIG. 12 illustrates a block diagram of an example computing device operable to execute the disclosed architecture.

Referring now to FIG. 12, there is illustrated a block diagram of a computer operable to execute, perform, and/or support any portion of the database system, such as the prediction system. In order to provide additional context for various aspects of the subject invention, FIG. 12 and the following discussion are intended to provide a brief, general description of a suitable computing environment 1200 in which the various aspects of the invention can be implemented. While the invention has been described above in the general context of computer-executable instructions that may be performed or run on one or more computers, those skilled in the art will recognize that the prediction system can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The database system components may be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, there is illustrated an exemplary environment 1200 for implementing various aspects of the invention that includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the invention can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1042 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory storage device 1250 is illustrated. The logical connections depicted include wired/wireless connectivity to a local area network (LAN) 1252 and/or larger networks, e.g., a wide area network (WAN) 1054. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 13:
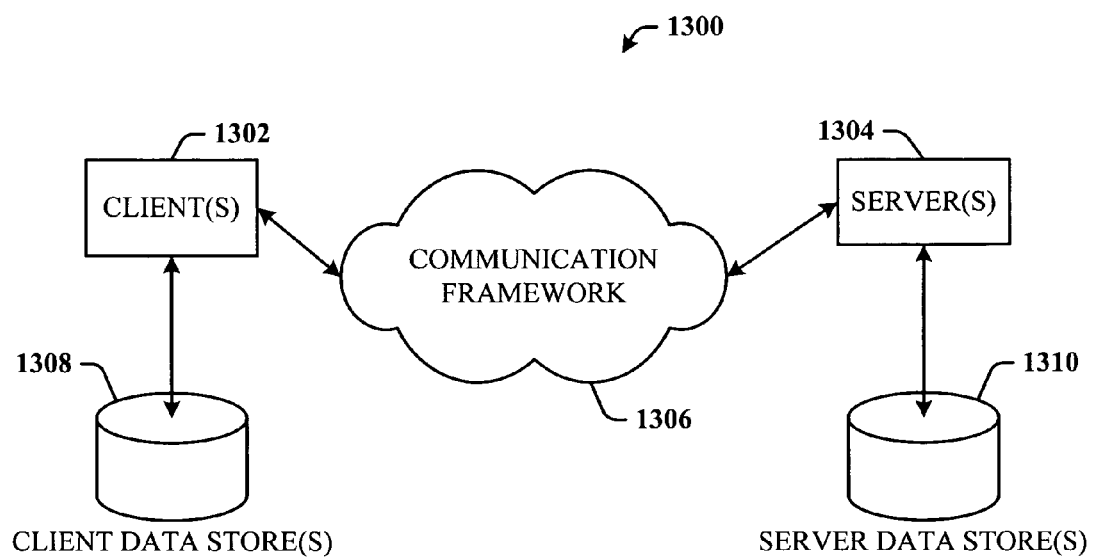
FIG. 13 illustrates a schematic block diagram of an exemplary computing device suitable for implementing the prediction system.

Referring now to FIG. 13, there is illustrated a schematic block diagram of an exemplary computing environment 1300 in accordance with the database system. The system 1300 includes one or more client(s) 1302. The client(s) 1302 can be hardware and/or software (e.g., threads, processes, computing devices). The client(s) 1302 can house cookie(s) and/or associated contextual information by employing the invention, for example.

The system 1300 also includes one or more server(s) 1304. The server(s) 1304 can also be hardware and/or software (e.g., threads, processes, computing devices). The servers 1304 can house threads to perform transformations by employing the invention, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Having described and illustrated the principles of our invention with reference to the illustrated embodiments, it will be recognized that the illustrated embodiments can be modified in arrangement and detail without departing from such principles.

For example, the client code, network usage, and the like may also be traced in addition to the database system.

In another example, other hardware configuration parameters (other than the buffer pool size, disk speed, and CPU speed) which affect database system performance may be modeled and included in the performance analysis of the throughput and/or latency. The other configuration parameters may include which tables are indexed, how many worker threads are in a given pool, and the like. Higher fidelity models of the CPU and storage components which may be appropriate for use with the above described cache simulator are discussed further in Ailamaki et al., "Where does time go?," Proc. 25$^{th}$ VLDB Conference, September 1999; Anderson, "Simple Table-based modeling of storage devices," Hewlett-Packard Laboratories, 2001, SSP technical report HPL-SSP-2001-4; Barroso, et al., "Memory system characteristics of commercial workloads," Proc. 25$^{th}$ International Symp. On Computer Architecture, June 1998; and Schindler, et al, "Lachesis: robust database storage management based on device-specific performance characteristics," Proc. 29$^{th}$ VLDB Conference, September 2003, which are all incorporated herein by reference. To use the detailed CPU models, instrumentation and trace extraction may be appropriately augmented to capture processor performance counters such as L1/L2 misses, and the like, as well as static analysis of transaction instruction mixes. In another example, distribution of the latency response time for each transaction X may be determined in addition to the mean latency. In this manner, a prediction of latency such as a probability distribution may be output in addition to or alternative to a resource demand graph of each transaction output of the prediction system.

In another example, the transaction mix may be assumed to be different for the predicted performance, which may be modeled with the current or virtual hardware configuration to determine effects on performance. The changing workload may be predicted in any suitable manner, such as by sub-sampling, e.g., selecting transactions in a different proportion from those observed in the live trace.

In another example, the performance of a hybrid transaction rate may be analyzed in addition to or alternative to the open and closed workload example discussed above. More particularly, the hybrid transaction rate may allow some but not all transactions to be time dependent on others. IN this manner, the notion of a higher level application operation may be captured, e.g., 'buy this product and show the user all related products') which may result in several related requests to the database system.

The above example is described with reference to database workloads of an OLTP system. However, other workloads may be used with different characteristics such as low-concurrency DSS workloads with time-varying resource usages, where each phase may be analyzed separately for bottlenecks and then combined to predict overall performance.

In view of the many possible embodiments to which the principles of the prediction system may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. A computer-implemented method comprising:
generating, by at least one processing unit, a live hardware trace of at least one transaction performed live on existing hardware resources of a database system, the existing hardware resources comprising a CPU, a memory having a buffer cache, and a disk, the live hardware trace indicating operations performed by the existing hardware resources of the database system while generating the live hardware trace, including accesses to the buffer cache of the memory, I/O requests to the disk, and CPU scheduler events;
generating an I/O request stream for a virtual hardware configuration, the I/O request stream corresponding to the live hardware trace, the virtual hardware configuration reflecting at least one hardware resource that is different than the existing hardware resources of the database system;
predicting an I/O service time of the at least one transaction on the virtual hardware configuration based upon the I/O request stream corresponding to the live hardware trace;
predicting a CPU service time of the at least one transaction on the virtual hardware configuration based upon the live hardware trace; and
predicting performance of the database system having the virtual hardware configuration, including the at least one hardware resource that is different than the existing hardware resource, based on the predicted I/O service time and the predicted CPU service time, wherein predicting performance includes predicting latency of the database system having the virtual hardware configuration.

2. The method of claim 1, wherein predicting latency includes predicting latency for a plurality of transactions of a predetermined type.

3. The method of claim 1, wherein in an instance where the at least one transaction is part of a closed-loop live workload, the predicting latency is based on determining a predicted transaction arrival rate and determining the latency based on the predicted transaction arrival rate.

4. The method of claim 1, wherein predicting latency includes distinguishing between background and critical path resource usage.

5. The method of claim 1, wherein predicting performance includes predicting throughput of the database system.

6. The method of claim 5, wherein predicting throughput includes predicting throughput for a plurality of transactions of a predetermined type.

7. The method of claim 1, wherein generating an I/O request stream includes simulating behavior of a virtual buffer cache by replaying the live hardware trace.

8. The method of claim 7, wherein the virtual hardware configuration includes at least one of:
a virtual buffer size of the virtual buffer cache which is different from a buffer size of the buffer cache of the memory of the database system,
a virtual number of cylinders of a disk storage,
a virtual number of seek times in the disk storage,
a virtual I/O request queue length, or
a virtual CPU speed.

9. One or more computer readable storage media containing computer readable instructions that, when executed, perform acts comprising:
tracing events performed by existing hardware resources of a live database system servicing a workload, the existing hardware resources comprising at least a CPU and a storage device, the events including at least one control flow event, at least one CPU scheduling event, at least one buffer pool activity event, or at least one storage device I/O event;
determining a virtual hardware configuration, the virtual hardware configuration reflecting a virtual hardware configuration parameter which is different from a live hardware configuration parameter of the existing hardware resources of the live database system;
identifying a bottleneck resource on throughput of at least a portion of the traced events on the virtual hardware configuration; and
determining a response time of the bottleneck resource to service at least a portion of the traced events on the virtual hardware configuration,
wherein determining a response time includes determining utilization of the bottleneck resource and determining slowdown of the bottleneck resource, and further predicting performance of the virtual hardware configuration based on the determined response time.

10. The computer readable storage media of claim 9, wherein the virtual hardware configuration includes at least one of a virtual buffer size which is different from a live buffer size of the live database system, a virtual number of cylinders of a disk storage which is different from a live number of cylinders of the storage device of the live database system, a virtual number of seek times in the disk storage which is different from a live number of seek times in the storage device of the live database system, a virtual I/O request queue length which is different from a live I/O request queue length of the live database system, and a virtual CPU speed which is different from a live CPU speed of the live database system.

11. The computer readable storage media of claim 10, wherein the bottleneck resource includes at least one of a virtual buffer pool having the virtual buffer pool size, a virtual CPU having the virtual CPU speed, a virtual I/O having the virtual number of cylinders of a disk storage, the virtual number of seek times, and the virtual I/O request queue length.

12. The computer readable storage media of claim 9, wherein determining a response time includes determining an average response time for a plurality of transactions of a predetermined type.

13. The computer readable storage media of claim 9, wherein in an instance where the workload is a closed-loop workload, determining a response time is based upon a predicted transaction arrival rate.

14. The computer readable storage media of claim 9, wherein determining a response time includes distinguishing between background and critical path resource usage.

15. One or more computer readable storage media containing computer executable instructions that, when executed, perform acts comprising:
generating a trace of a plurality of events in a live workload on existing hardware resources of a database system, the existing hardware resources reflecting a live hardware configuration of the database system;
extracting a demand trace, wherein the demand trace is independent of the live hardware configuration of the database system;
simulating a virtual cache of the database system based on the demand trace;
modeling a virtual storage device of the database system based on an output of the virtual cache;
modeling a virtual CPU of the database system based on the demand trace; and
predicting performance of the database system serving the live workload having at least one of the virtual cache, the virtual storage device, or the virtual CPU, wherein predicting performance includes predicting latency or throughput of the database system,
wherein at least one of the virtual cache, the virtual storage device, or the virtual CPU is different than the existing hardware resources of the database system on which the trace was generated.

16. The computer readable storage media of claim 15, the acts further comprising visualizing the predicted performance for at least one of the virtual cache, the virtual storage device, or the virtual CPU.

17. The computer readable storage media of claim 15, the acts further comprising optimizing performance of the database system based on at least one of the virtual cache, the virtual storage device, or the virtual CPU.

* * * * *